US011267151B1

(12) United States Patent
Randall

(10) Patent No.: US 11,267,151 B1
(45) Date of Patent: Mar. 8, 2022

(54) COIN WRAPPER CUTTER

(71) Applicant: Robin L. Randall, Sunnyvale, CA (US)

(72) Inventor: Robin L. Randall, Sunnyvale, CA (US)

(73) Assignee: GreenCoinUSA LLC, Sunnyvale, CA (US)

( * ) Notice: Subject to any disclaimer, the term of this patent is extended or adjusted under 35 U.S.C. 154(b) by 0 days.

(21) Appl. No.: 17/133,465

(22) Filed: Dec. 23, 2020

(51) Int. Cl.
*B26B 29/06* (2006.01)
*B26D 3/00* (2006.01)
*H02G 1/12* (2006.01)
*B67B 7/46* (2006.01)

(52) U.S. Cl.
CPC .............. *B26D 3/001* (2013.01); *B26B 29/06* (2013.01); *B67B 7/30* (2013.01); *H02G 1/1229* (2013.01)

(58) Field of Classification Search
CPC ...... B26D 3/0014; B26D 3/001; B26B 27/00; B26B 27/005; B26B 29/06; B67B 7/30; H02G 1/1217; H02G 1/1219; H02G 1/1229
USPC .... 30/2, 90.4, 92.5, 283, 286, 289, 293, 294
See application file for complete search history.

(56) References Cited

U.S. PATENT DOCUMENTS

| | | | | |
|---|---|---|---|---|
| 1,105,182 A | * | 7/1914 | Caspers et al. ....... | B26B 27/005 30/2 |
| 1,165,176 A | * | 12/1915 | Hornor ................ | H02G 1/1229 30/90.6 |
| 1,959,378 A | | 5/1934 | Magill | |
| 2,018,149 A | * | 10/1935 | Randle et al. ........ | B26B 27/005 30/2 |
| 2,050,768 A | | 8/1936 | Seymour | |
| 2,468,122 A | * | 4/1949 | Shepard ............... | H02G 1/1229 30/90.6 |
| 2,520,000 A | * | 8/1950 | Dettman ................. | B26D 3/30 83/879 |
| 2,621,659 A | * | 12/1952 | Greene ................... | A47J 17/06 30/120.1 |
| 2,776,480 A | * | 1/1957 | Abel ........................ | B26D 3/30 30/124 |
| 3,092,906 A | * | 6/1963 | Deering ............... | H02G 1/1229 30/90.6 |
| 3,238,618 A | * | 3/1966 | Cook, Jr. ............. | H02G 1/1217 30/90.4 |
| 3,777,397 A | * | 12/1973 | Johnson ............... | H02G 1/1229 30/90.6 |
| 4,001,934 A | * | 1/1977 | Bell ........................ | B26B 27/00 30/124 |
| 4,106,196 A | * | 8/1978 | Smithline ............... | B26B 27/00 30/286 |
| 4,459,745 A | * | 7/1984 | Britton ................. | H02G 1/1217 30/90.4 |

(Continued)

*Primary Examiner* — Clark F Dexter
(74) *Attorney, Agent, or Firm* — Sheppard Mullin Richter & Hampton LLP; Xin Xie

(57) ABSTRACT

A cutting apparatus cuts a wrapper of a roll of coins along a longitudinal axis. The cutting apparatus includes an interior cavity between a front cover and a back cover and a rail section disposed beneath the interior cavity. The rail section includes an opening through a cross section of the flat rail section, wherein a cutting surface extends through the opening and the roll of coins is compressed against the rail section while cutting. The cutting apparatus further includes overhangs oriented at edges of, perpendicular to and extending below the flat rail section, the overhangs aligned with the front cover.

13 Claims, 25 Drawing Sheets

(56) References Cited

U.S. PATENT DOCUMENTS

| | | | | |
|---|---|---|---|---|
| 4,536,957 | A * | 8/1985 | Britton | H02G 1/1217 |
| | | | | 30/90.4 |
| D292,139 | S | 9/1987 | Beal | |
| 4,757,611 | A * | 7/1988 | Tommi et al. | G07D 9/00 |
| | | | | 30/2 |
| 4,813,141 | A * | 3/1989 | Funger | B26B 5/005 |
| | | | | 30/290 |
| 5,555,624 | A * | 9/1996 | McCracken | B26B 27/00 |
| | | | | 30/2 |
| 5,887,346 | A * | 3/1999 | McCasland | B26F 1/3846 |
| | | | | 30/90.1 |
| 5,992,286 | A * | 11/1999 | Boole | B65B 69/0033 |
| | | | | 30/280 |
| 6,029,355 | A * | 2/2000 | Carlin | B26D 3/001 |
| | | | | 30/287 |
| 6,615,495 | B1 * | 9/2003 | Evens et al. | B26B 29/06 |
| | | | | 30/2 |
| 7,814,662 | B2 * | 10/2010 | O'Neal | H02G 1/1229 |
| | | | | 30/90.1 |
| 8,429,825 | B2 * | 4/2013 | Johanson | B26B 27/005 |
| | | | | 30/2 |
| 2017/0304903 | A1 * | 10/2017 | Smith et al. | B29C 65/02 |

\* cited by examiner

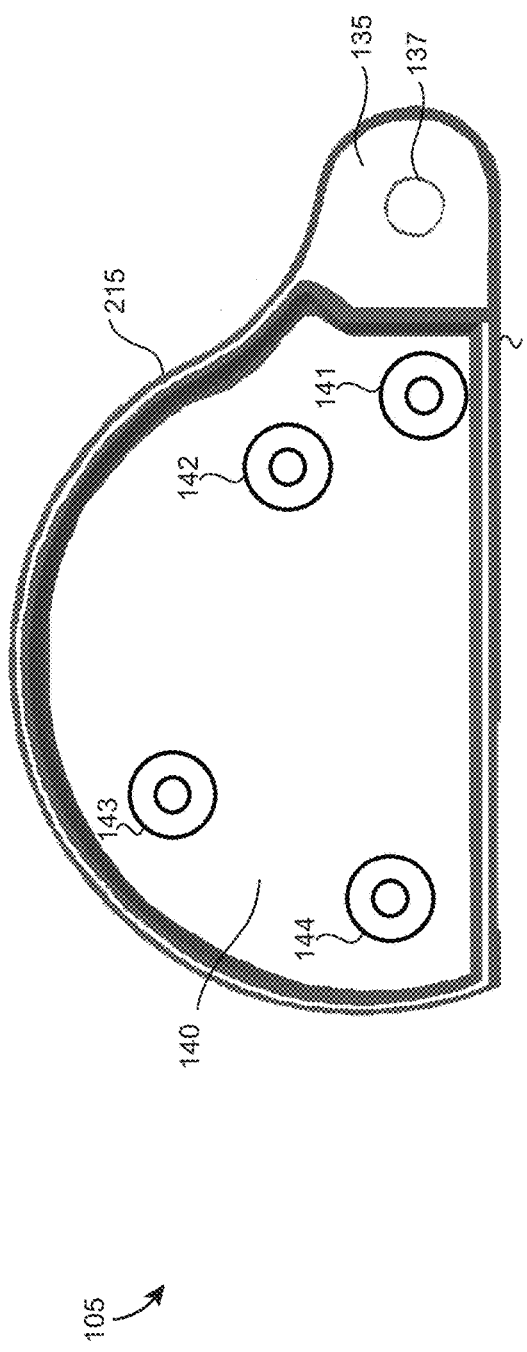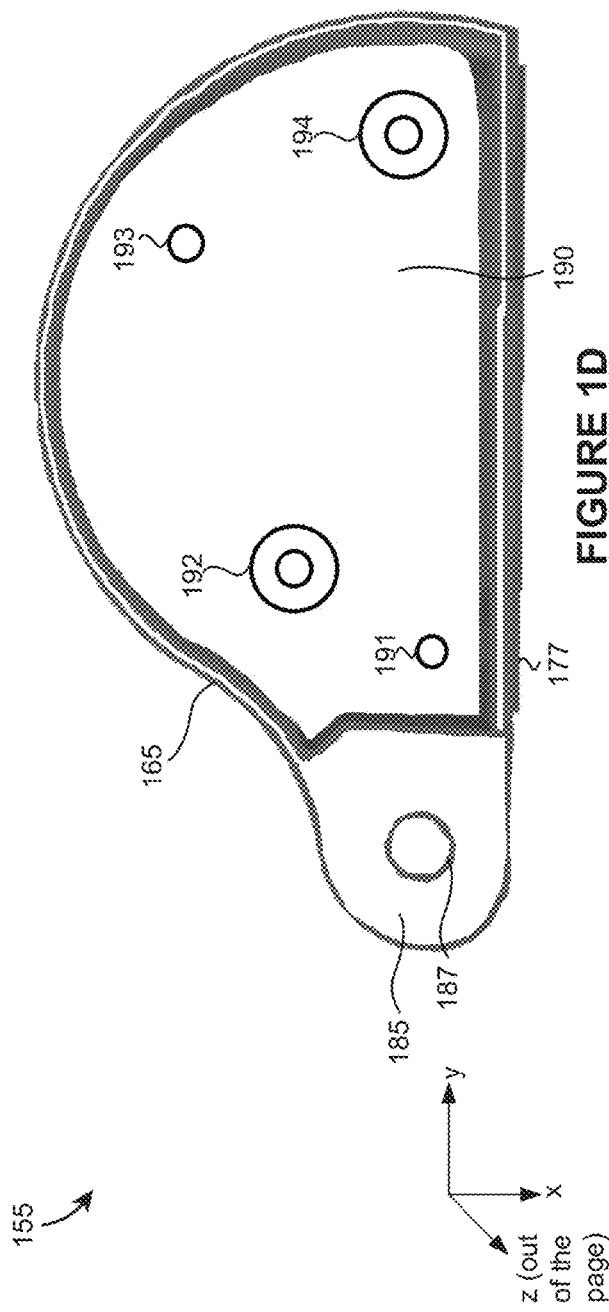

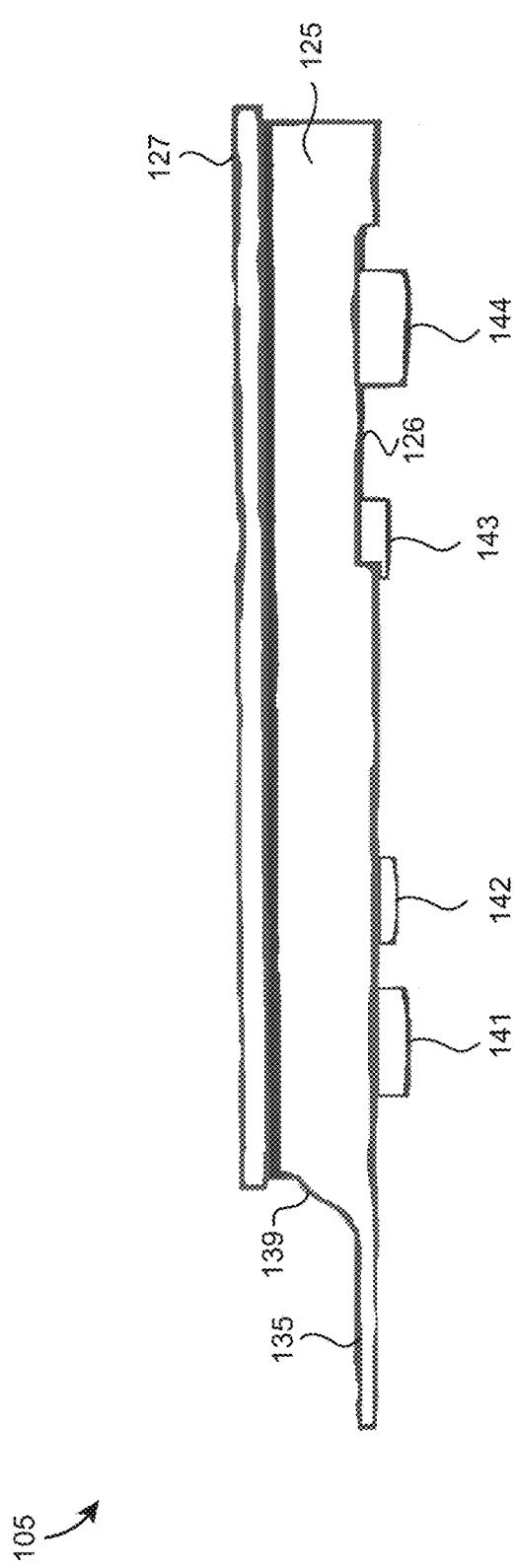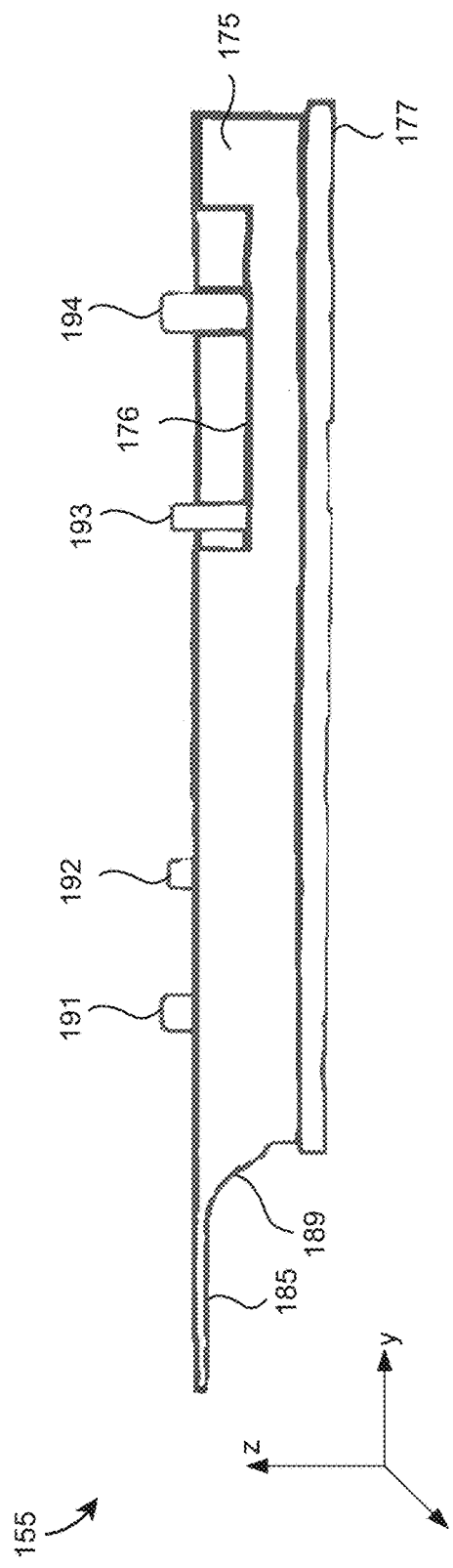

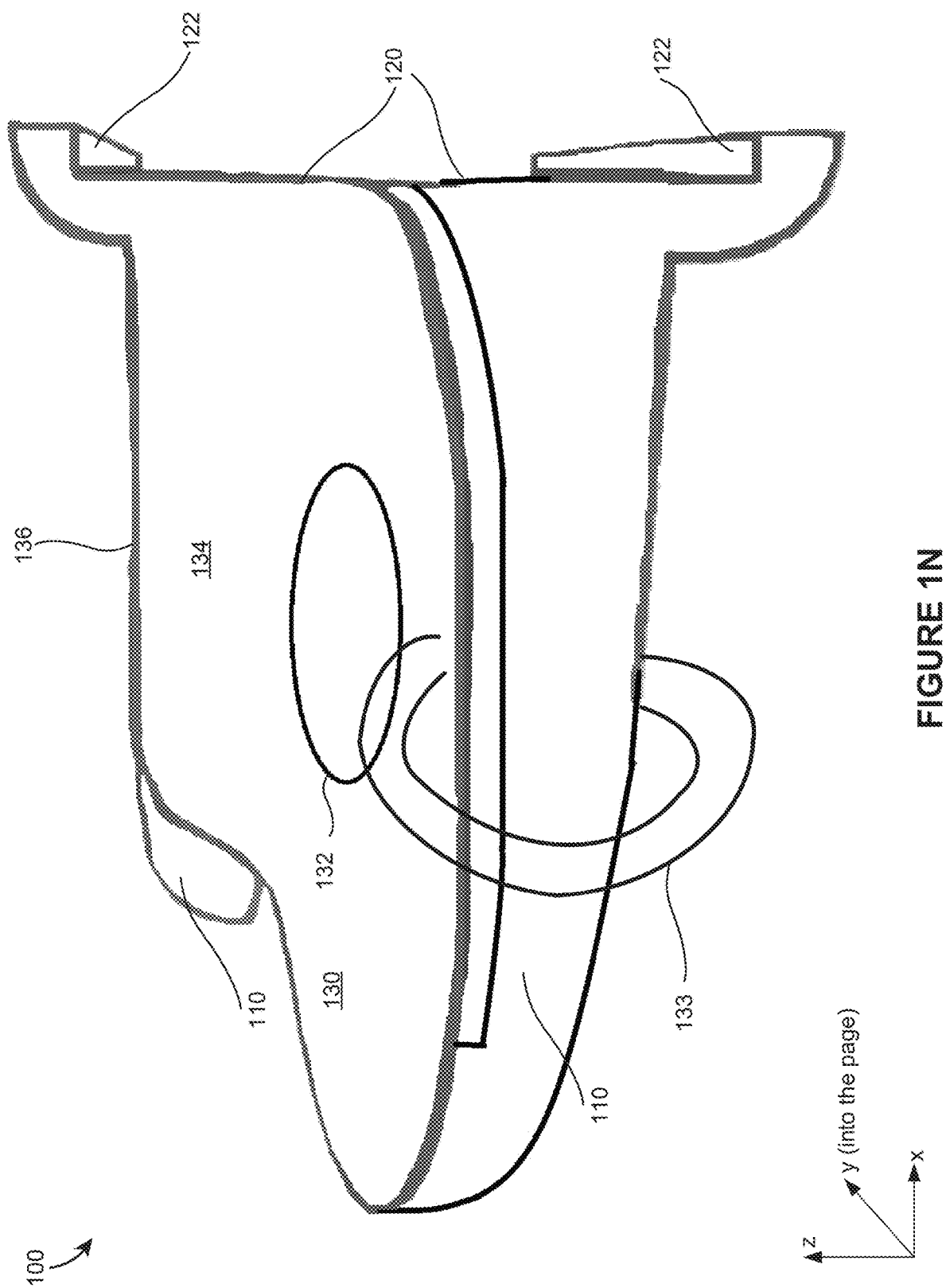

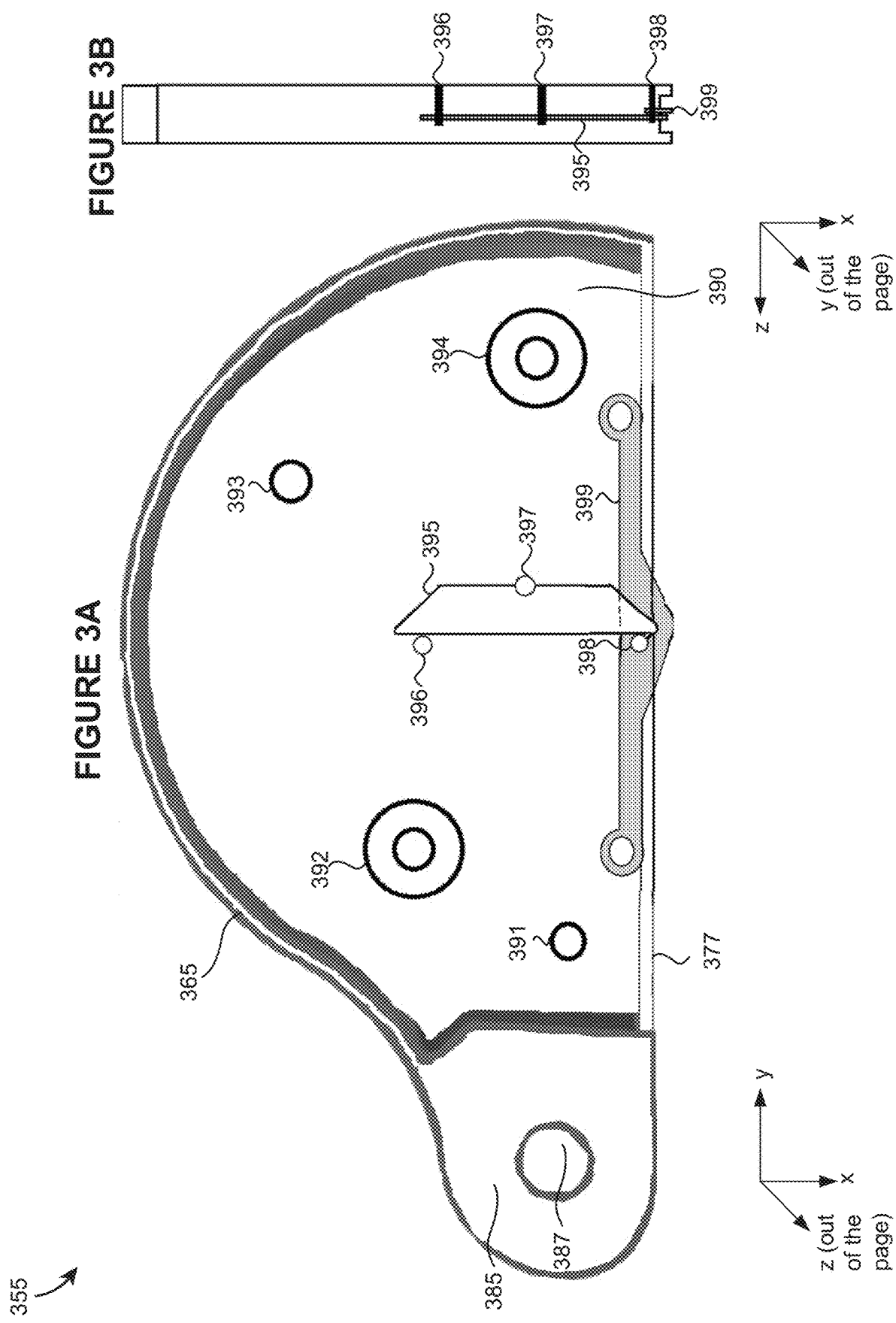

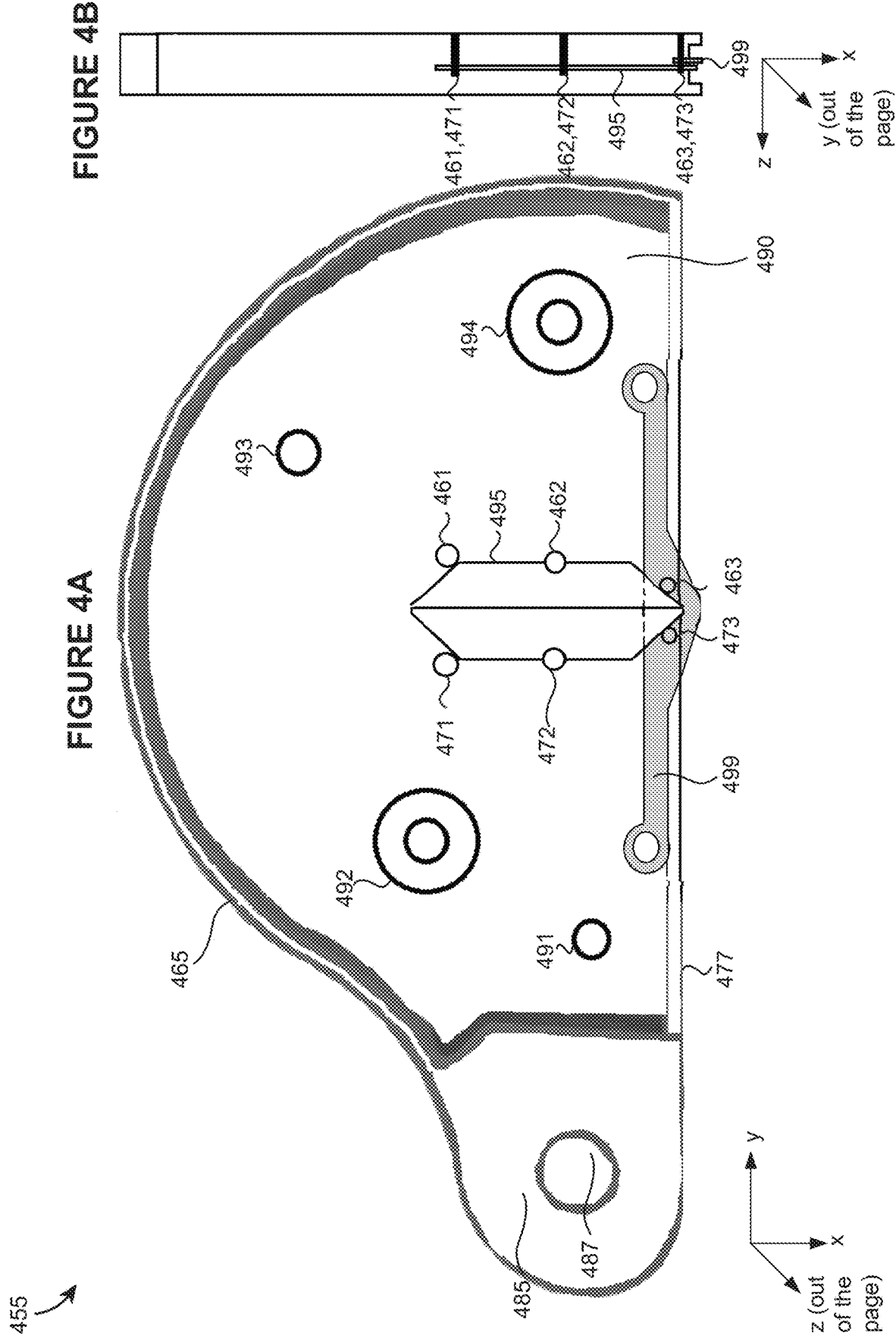

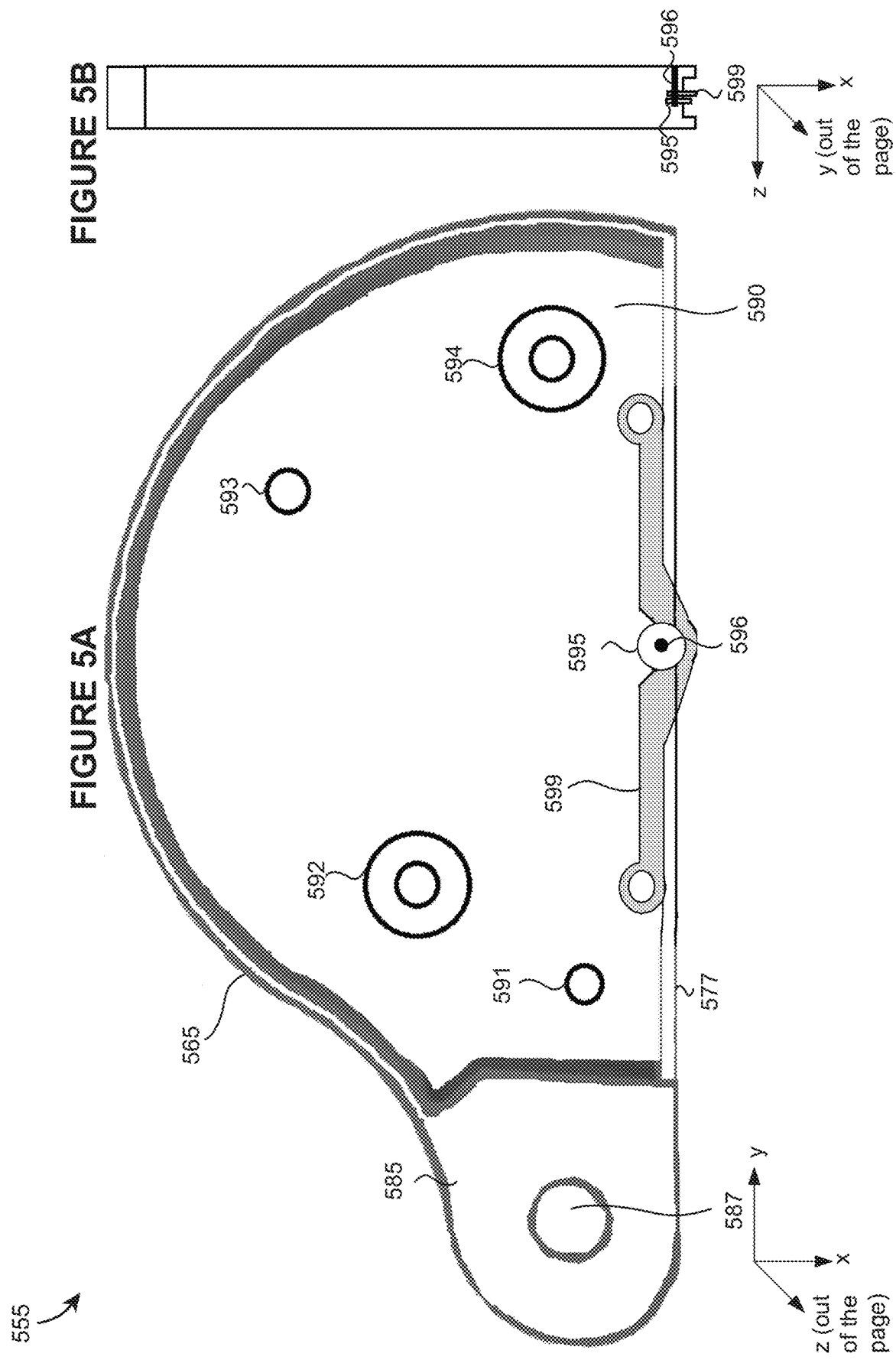

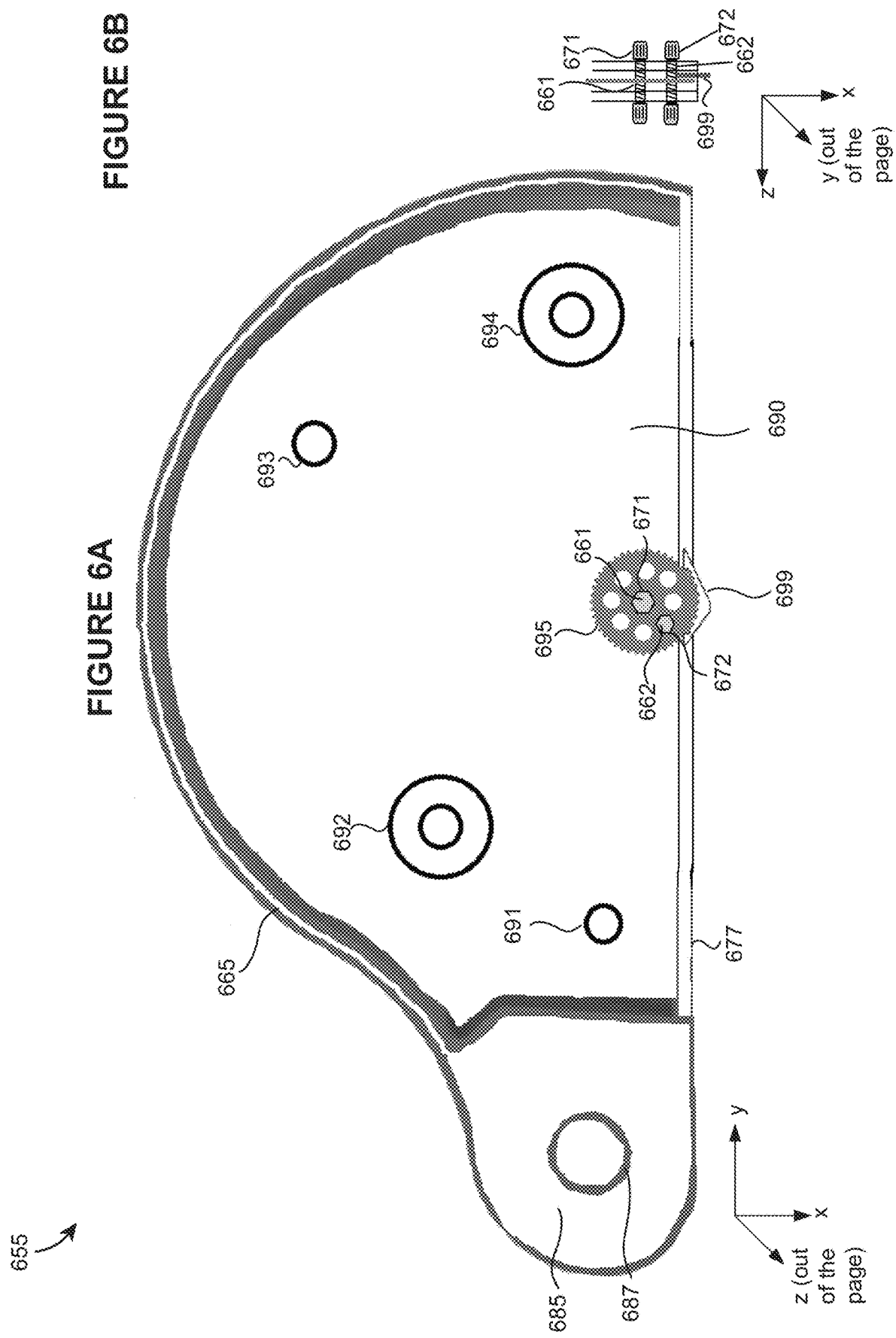
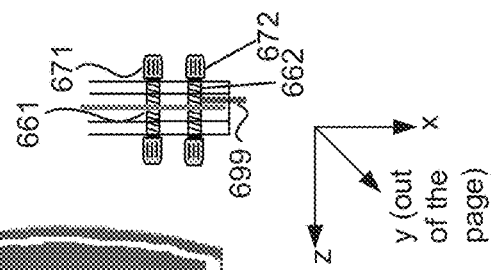

COIN WRAPPER CUTTER

BACKGROUND

Coins are typically packaged in rolls or wrappers at banks at stores. The rolls or wrappers may be made from paper or shrink wrap. In order to obtain change during cash transactions, workers at these banks or stores frequently need to open coin wrappers in an efficient and safe manner by cutting the wrappers evenly and along a straight line so that the coins are dislodged from the wrappers in a predictable fashion. In addition, cutters used to cut these wrappers need to be safe to operate so that they do not puncture a person's skin during operation. However, current cutters do not effectively address these needs. For example, U.S. Pat. No. 1,959,378 includes a recessed blade that is replaceable and detachable. U.S. Pat. No. 2,050,768, meanwhile, includes two opposing blades used to made an incision on a paper tube. Moreover, U.S. Design Pat. No. 292,139 shows a coin roll opener which has a rigidly mounted circular blade held with its blade portion above the floor of the device. These cutters have exposed blades which increases a risk of injury to the user.

SUMMARY

Described herein, in some embodiments, is a cutting apparatus configured to safely cut a wrapper that encloses a roll of coins, or any material requiring a longitudinal cut. In some embodiments, described herein is a cutting apparatus configured to cut a wrapper of a roll of coins along a longitudinal axis, comprising: an interior cavity between a front cover and a back cover; a rail section disposed beneath the interior cavity, the rail section comprising an opening through a cross section of the flat rail section, wherein a cutting surface extends through the opening and the roll of coins is compressed against the rail section while cutting; and overhangs oriented at edges of, perpendicular to and extending below the flat rail section, the overhangs aligned with or parallel to at least a portion of the front cover, such as a flat portion of the front cover.

In some embodiments, the cutting apparatus further comprises the cutting surface; and a guard disposed parallel to and extending below the cutting surface, the guard including a rubber material and being configured to protect the cutting surface from puncturing skin or an other surface besides the roll of coins.

In some embodiments, the cutting surface comprises a blade having a single edge that extends through the opening.

In some embodiments, the cutting surface comprises two nonparallel edges that extend through the opening.

In some embodiments, the cutting surface comprises a circular blade that extends through the opening.

In some embodiments, the cutting surface comprises a gear including serrations that extends through the opening.

In some embodiments, the cutting apparatus further comprises a central shaft at a center of the cutting surface configured to affix the cutting surface to the interior cavity; and a detachable shaft disposed acentrically with respect to the cutting surface, wherein, when the detachable shaft is detached from the central shaft, the cutting surface rotates about the central shaft.

In some embodiments, the cutting surface further comprises a rotatable blade; and the cutting apparatus further comprises: a movable shaft connected to the cutting surface; a plunger in contact with the movable shaft, wherein, in response to a force being applied to the plunger, the movable shaft transfers at least a portion of the applied force to the cutting surface, thereby causing rotational displacement of the cutting surface about a stationary shaft.

In some embodiments, the rotatable blade is in a retracted position in which the rotatable blade does not extend into the opening when no force is applied to the plunger, and in an extended position in which the rotatable blade extends into the opening when the force is applied to the plunger.

In some embodiments, the cutting apparatus further comprises a second shaft positioned such that, when the rotatable blade contacts the second shaft, the rotatable blade is prevented from further rotational displacement.

In some embodiments, the cutting surface comprises a ceramic material.

In some embodiments, the cutting apparatus further comprises an extendible holder that decreases a gap between the overhangs such that, during cutting, the roll of coins is positioned between the rail section and the extendible holder.

In some embodiments, the extendible holder comprises a concave section.

In some embodiments, the cutting apparatus further comprises coupling pins disposed in the interior cavity and configured to securely fasten the front cover to the back cover.

In some embodiments, the cutting apparatus further comprises a link having a ridge; and a catch having an indentation, the catch configured to hold the link in place as the ridge is positioned into the indentation to securely fasten the front cover to the back cover.

In some embodiments, the cutting apparatus has a handle portion adjacent to the interior cavity and having an eyelet, the handle portion having a uniform width throughout, the uniform width being smaller compared to a width of the interior cavity.

In some embodiments, a periphery of the handle portion is rounded.

In some embodiments, the rail section and the overhangs comprise rounded edges at their respective peripheries and linear edges at their respective interiors, the periphery of the rail section blending into the peripheries of the overhangs.

In some embodiments, the overhangs extend beyond a width between the front cover and the back cover.

In some embodiments, a periphery defined by the front cover and the back cover is rounded.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 1C illustrates an underside surface of a female component of a cutting apparatus 100 according to some embodiments.

FIG. 1D illustrates an underside surface of a male component of a cutting apparatus according to some embodiments.

FIG. 1I illustrates a front view of a female component of a cutting apparatus according to some embodiments.

FIG. 1J illustrates a front view of a male component of a cutting apparatus according to some embodiments.

FIG. 1N illustrates a perspective side view of a cutting apparatus according to some embodiments.

FIG. 1O illustrates a front view of a cutting apparatus according to some embodiments.

FIGS. 3A, 3B, 4A, 4B, 5A, 5B, 6A, 6B, 7A, and 7B illustrate implementations of a blade, gear or other cutting assembly that may be used in conjunction with the embodiments illustrated in FIGS. 1A-1P- and 2A-2B, according to some embodiments.

DETAILED DESCRIPTION

Embodiments described herein provide a cutting apparatus that safely cuts a wrapper enclosing or encasing a roll of coins. The cutting apparatus may be utilized to cut different types of wrappers, including paper and plastic. The coin roll opener may operate even when the coin roll opener and/or the roll of coins are not rested on a surface such as a table top.

Figure 1A:
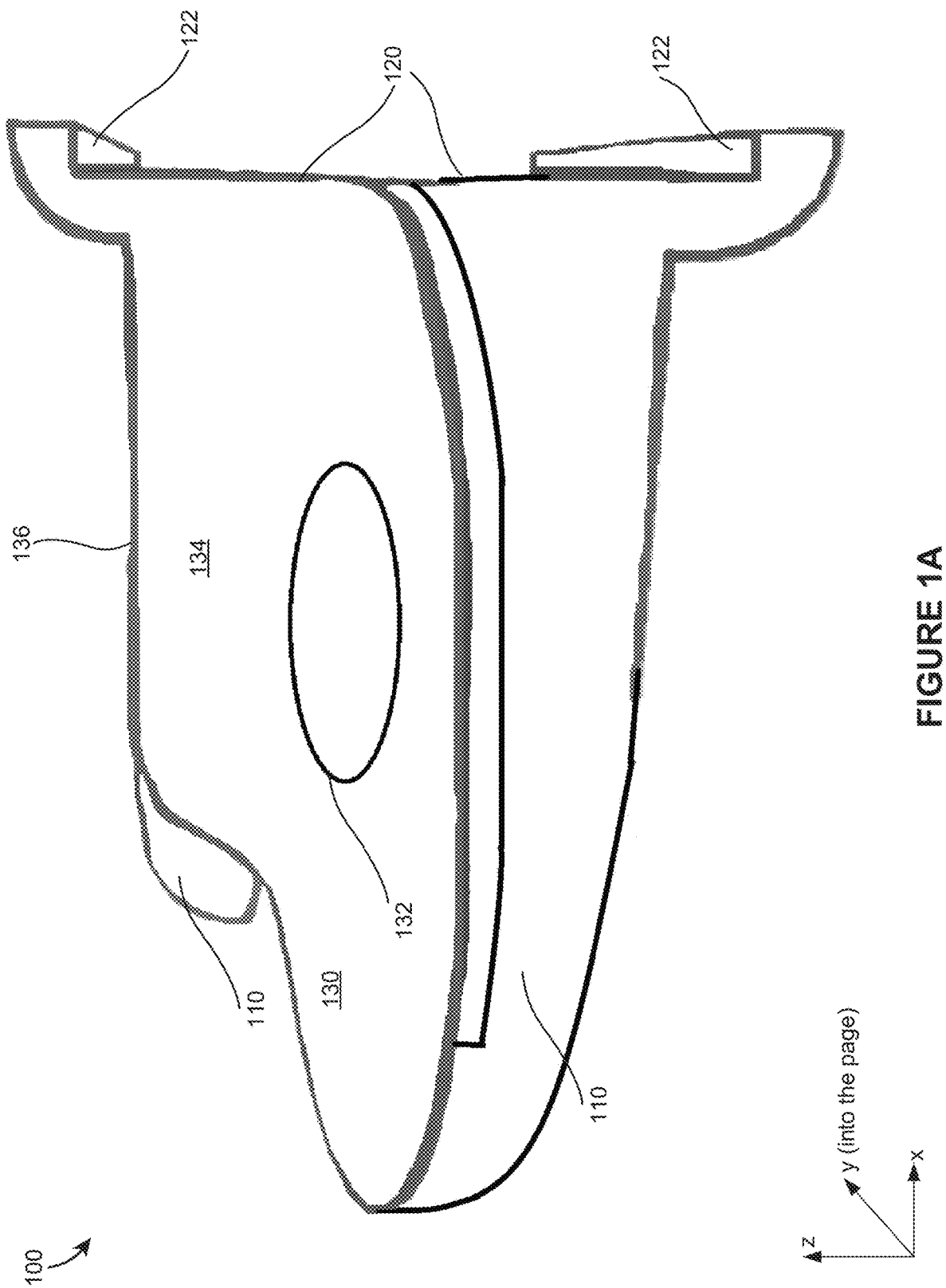
FIG. 1A illustrates a side view of a cutting apparatus according to some embodiments.

FIG. 1A illustrates a cutting apparatus 100 according to some embodiments. In FIG. 1A, a side view of the cutting apparatus 100 is shown to include a periphery or rim (hereinafter "periphery") 110, rails 120 which constitute a part of the periphery 110 that is parallel to the y-z plane and disposed along a positive x-axis, overhangs, protrusions, or ledges (hereinafter "overhangs") 122, a handle portion 130 including an eyelet 132, inclined surfaces 134, and a body portion 136. The handle portion 130 may have a smaller width, along a z-direction, compared to the inclined surfaces 134 and the body portion 136. The rails 120 may be an entirely flat segment, as shown in FIG. 1A. In some embodiments, the handle portion 130 may be at least partially magnetic, or contain a magnetic covering on an exterior of the handle portion 130.

In other examples, the rails 120 may be at least partially flat or at least partially curved, for example, concave inward, to match a curvature of coins. In some embodiments, the overhangs 122 may extend lower than a surface of, and/or be perpendicular to, the rails 120. The rails 120 may be a cutting surface on which a roll of coins is compressed against and moved along while cutting, and include an opening (not shown in FIG. 1A) through which a blade, gear, or other cutting instrument may extend. The handle portion 130, the inclined surfaces 134, and the body portion 136 include corresponding surfaces of a lower portion of the cutting apparatus 100, formed by a male component, not visible in FIG. 1A but illustrated in the subsequent FIGURES. The inclined surfaces 134 are positioned directly between and transition smoothly between the handle portion 130 and the body portion 136.

Figure 1B:
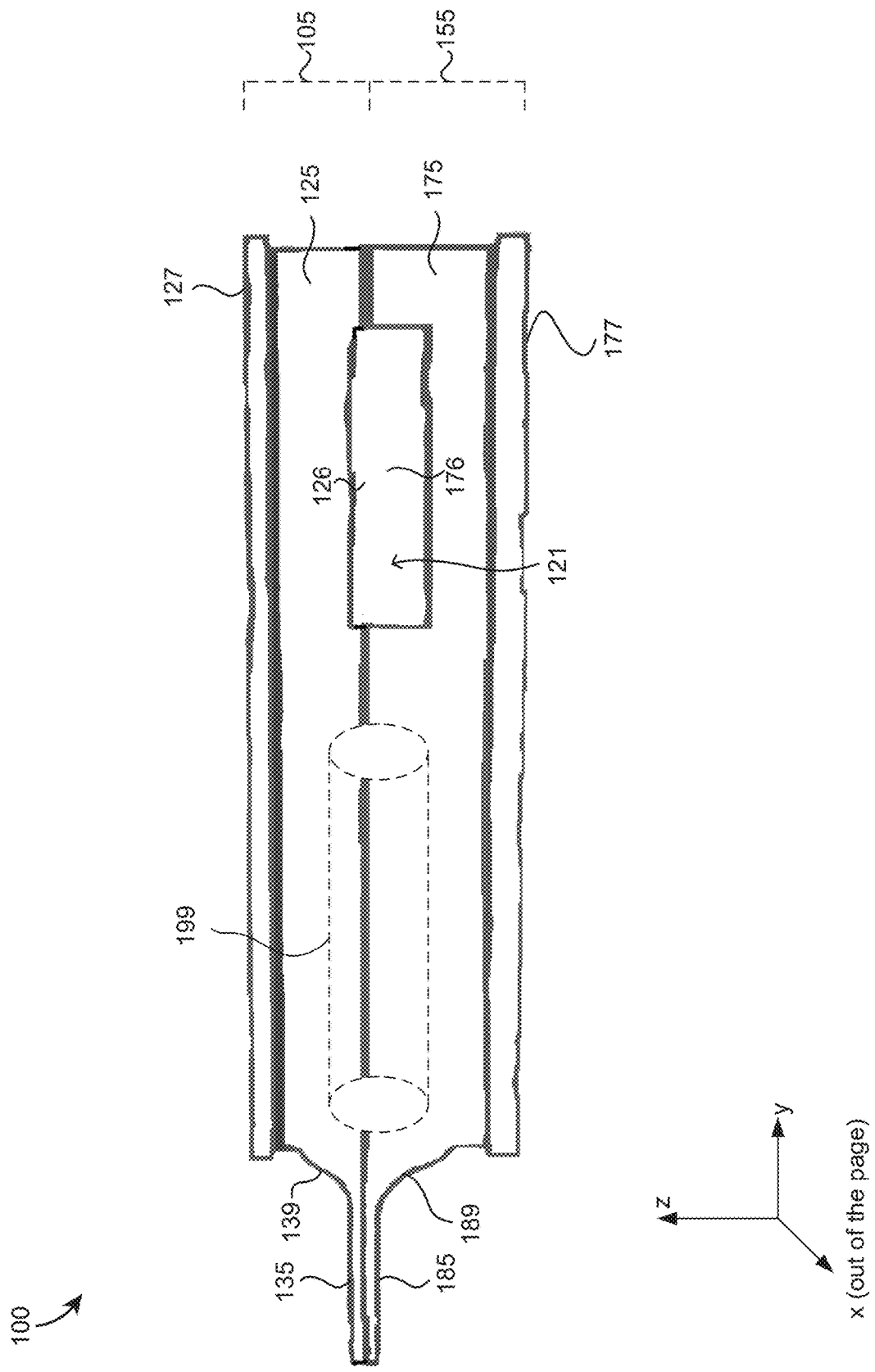
FIG. 1B illustrates a front view of a cutting apparatus according to some embodiments.

FIG. 1B illustrates a bottom view of the cutting apparatus 100, formed by combining a female component 105 and a male component 155, consistent with the embodiment shown according to FIG. 1A. In FIG. 1B, the rails 120 shown in FIG. 1A include a rail 125 on the female component 105 and a rail 175 on the male component 155. The overhang 122 includes an overhang 127 on the female component 105 and an overhang 177 on the male component 155. The overhangs 127 and 177 may comprise a plastic material. The rails 120 may include an opening 121 through which a blade, gear, or other cutting instrument may extend. When a roll of coins 199 is passed along the opening 121 of the rails 120, a blade, gear, or other cutting instrument may safely engage the roll of coins 199 along an axial or longitudinal axis of the roll of coins 199 to form an incision along the longitudinal axis. The opening 121 may be formed by combining an opening 126 on the female component 105 and an opening 176 on the male component 155. The handle portion 130 of FIG. 1A includes a handle portion 135 on the female component 105 and a handle portion 185 on the male component 155. The inclined surfaces 134 of FIG. 1A includes an inclined surface 139 on the female component 105 and an inclined surface 189 on the male component 155.

FIG. 1C illustrates an underside surface of the female component 105 of the cutting apparatus 100, opposite of a front cover, consistent with the embodiment shown according to FIGS. 1A and 1B. In FIG. 1C, the female component 105 of the cutting apparatus 100 includes the handle portion 135 having an eyelet 137, and further includes a periphery 115, the overhang 127, and an interior cavity 140 in which female coupling pins or connectors (hereinafter "female coupling pins") 141, 142, 143, and 144 may be connected to complementary male coupling pins or connectors 191, 192, 193, and 194, respectively, as shown in FIG. 1D. The female coupling pins 141, 142, 143, and 144 may have a shape and/or texture complementary to the male coupling pins or connectors 191, 192, 193, and 194. Although four female coupling pins are shown, any number of female coupling pins may be present.

FIG. 1D illustrates an underside surface of the male component 155 of the cutting apparatus 100, opposite of a back cover, consistent with the embodiment shown according to FIGS. 1A and 1B. In FIG. 1D, the male component 155 of the cutting apparatus 100 includes the handle portion 185 having an eyelet 187, and further includes a periphery 165, the overhang 177, and an interior cavity 190 in which the male coupling pins or connectors (hereinafter "male coupling pins") 191, 192, 193, and 194 may be connected to female coupling pins shown in FIG. 1C. Although four male coupling pins are shown, any number of male coupling pins may be present. The male coupling pins 191, 192, 193, and 194 may include alignment pins, for example. One or more of the male coupling pins 191, 192, 193, and 194 may be threaded and/or tapered to facilitate a rigid coupling between the male component 155 and the female component 105, while still permitting disassembly of the male component 155 and the female component 105 if blade replacement is required. The cavity 190 may house additional components such as a blade, gear, or cutting assembly, and/or an additional or alternate attachment component, as will be shown in FIGS. 2A, 2B, 3A, 3B, 4A, 4B, 5A, 5B, 6A, 6B, 7A, 7B, and 8A-8F.

Figure 1E:
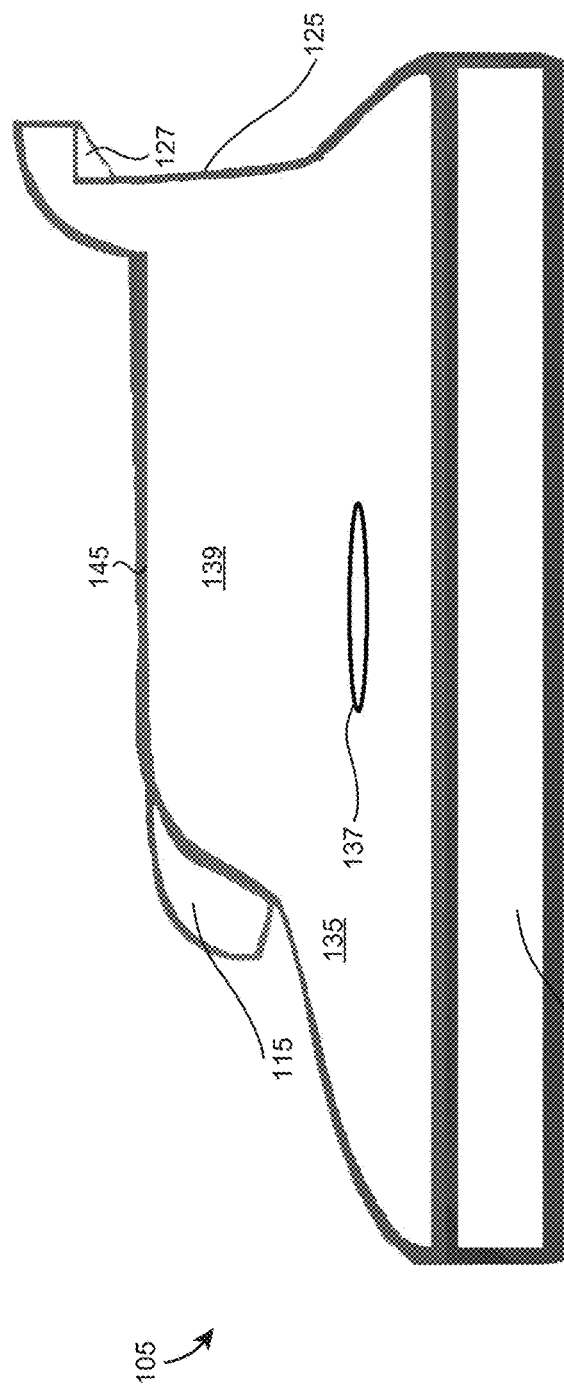
FIG. 1E illustrates a side view of a female component of a cutting apparatus according to some embodiments.

FIG. 1E illustrates a side view of the female component 105 of the cutting apparatus 100, consistent with the embodiment shown according to FIGS. 1A, 1B and 1C. In FIG. 1E, the female component 105 is shown to include the periphery 115, rail 125 which constitutes a part of the periphery 115 that is parallel to the y-z plane and disposed along a positive x-axis, the overhang 127, the handle portion 135 including the eyelet 137, the inclined surface 139, and a body portion 145. In some embodiments, the overhang 127 may extend beyond a surface of, and be parallel to, the rail 125. The inclined surface 139 is positioned directly between and transitions smoothly between the handle portion 135 and the body portion 145.

Figure 1F:
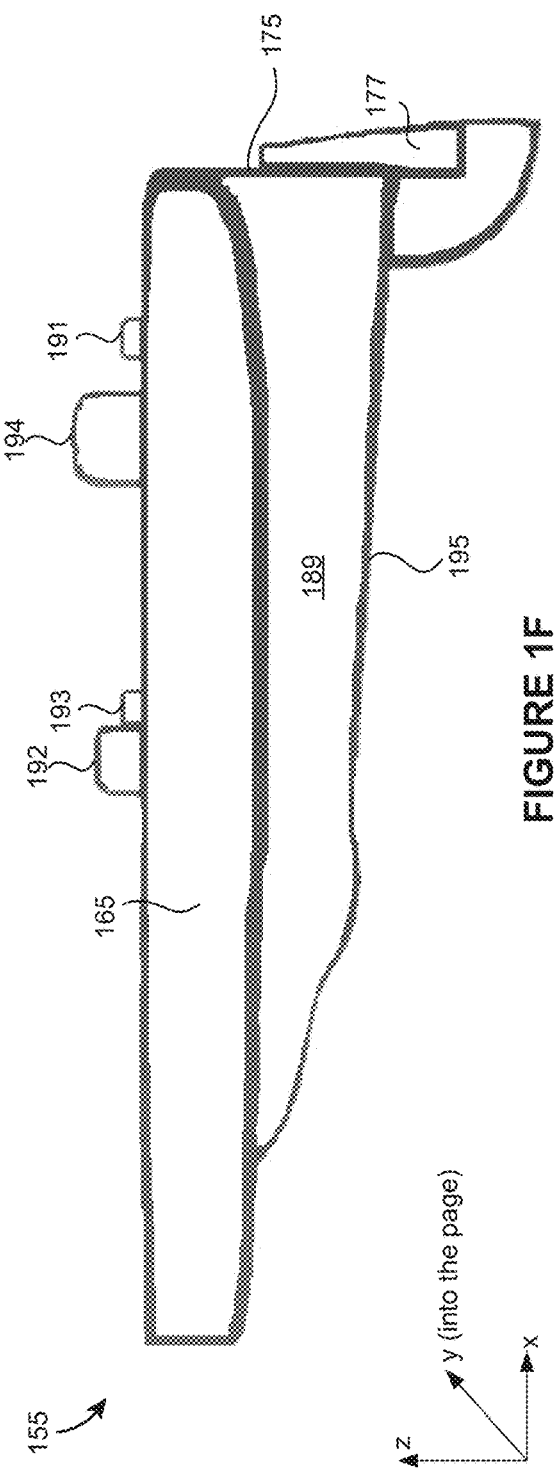
FIG. 1F illustrates a side view of a male component of a cutting apparatus according to some embodiments.

FIG. 1F illustrates a side view of the male component 155 of the cutting apparatus 100, consistent with the embodiment shown according to FIGS. 1A, 1B and 1D. In FIG. 1F, the male component 155 is shown to include the periphery 165, rail 175 which constitutes a part of the periphery 165 that is parallel to the y-z plane and disposed along a positive x-axis, the overhang 177, the inclined surface 189, and a body portion 195. In some embodiments, the overhang 177 may extend beyond a surface of, and be parallel to, the rail 175. The inclined surface 189 is positioned directly between and transitions smoothly between the handle portion 185 and the body portion 195.

Figure 1G:
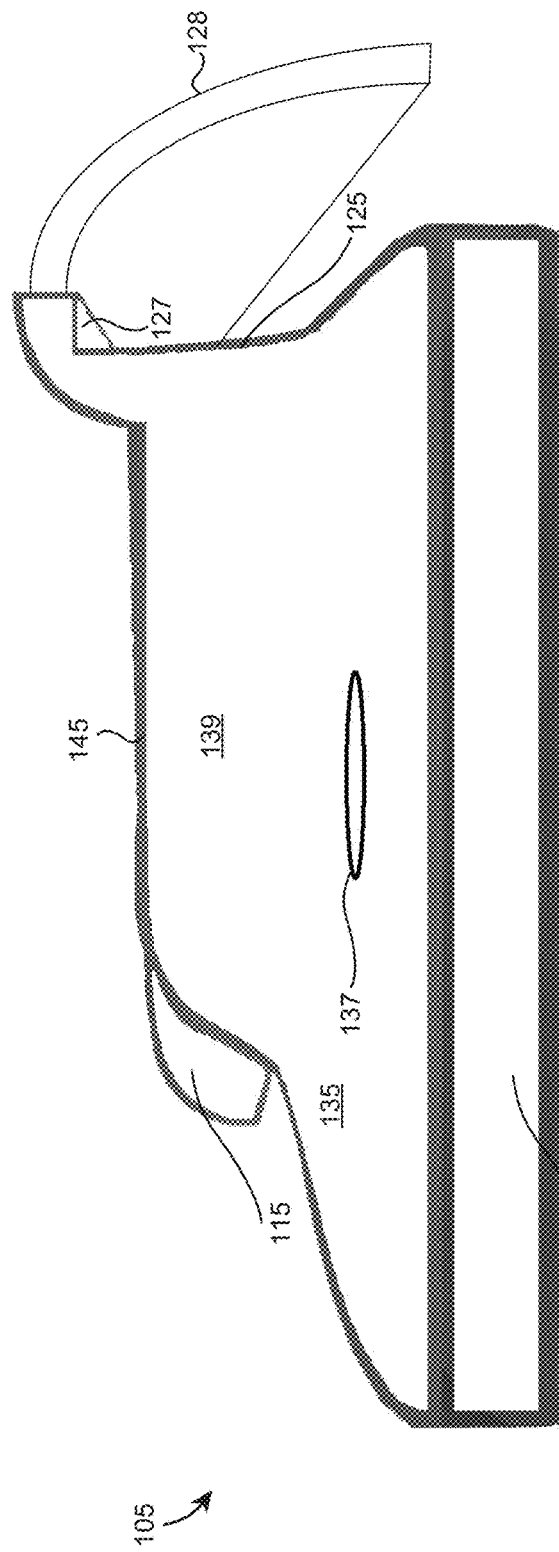
FIG. 1G illustrates a side view of a female component of a cutting apparatus according to some embodiments.
Figure 1H:
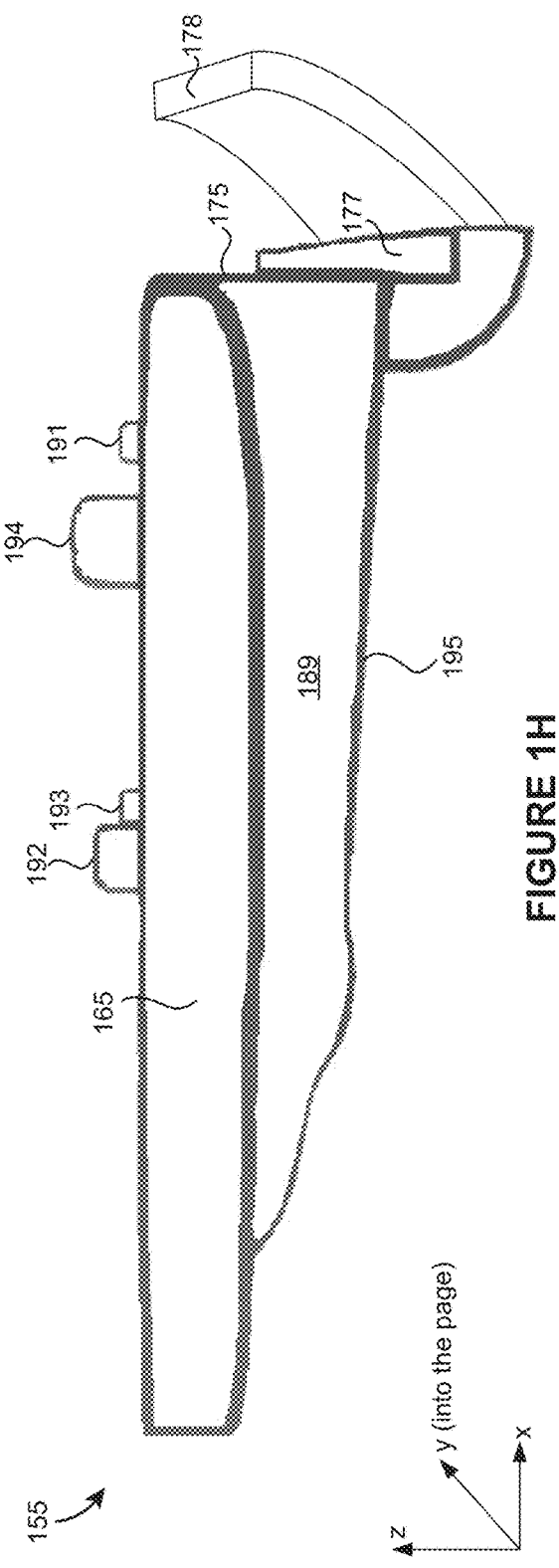
FIG. 1H illustrates a side view of a male component of a cutting apparatus according to some embodiments.

FIGS. 1G and 1H illustrate an exemplary embodiment including side views of the female component 105 and the male component 155, respectively. In FIG. 1G, a plate or covering (hereinafter "covering") 128 may extend from the overhang 127. In FIG. 1H, a plate or covering (hereinafter "covering") 178 may extend from the overhang 177. The covering 128 and/or 178 may be slidable so that their respective lengths may be adjustable. The covering 128 and the covering 178 may partially or fully eliminate a distance, along a z-axis, between the overhang 127 and the overhang 177, to form a holder for the roll of coins to rest against the covering 128 and 178 before and/or after a wrapper of the roll is cut, such that the roll and/or coins in the roll would not fall out of the cutting apparatus 100. Thus, once the covering that includes 128 and 178 is extended partially or fully, the cutting apparatus 100 and/or the roll of coins would not need to be placed on a surface, such as a table, in order to operate the cutting apparatus 100.

FIG. 1I illustrates a bottom view of the female component 105, consistent with the embodiment shown according to FIGS. 1A, 1B, 1C, and 1E. In FIG. 1I, the female component 105 is shown to include the rail 125 containing the opening 126. Also visible in FIG. 1I are the overhang 127, the handle portion 135, the inclined surface 139, and the female coupling pins 141, 142, 143, and 144.

FIG. 1J illustrates a bottom view of the male component 155, consistent with the embodiment shown according to FIGS. 1A, 1B, 1D, and 1F. In FIG. 1J, the male component 155 is shown to include the rail 175 containing the opening 176. Also visible in FIG. 1J are the overhang 177, the handle portion 185, the inclined surface 189, and the male coupling pins 191, 192, 193, and 194.

Figure 1K:
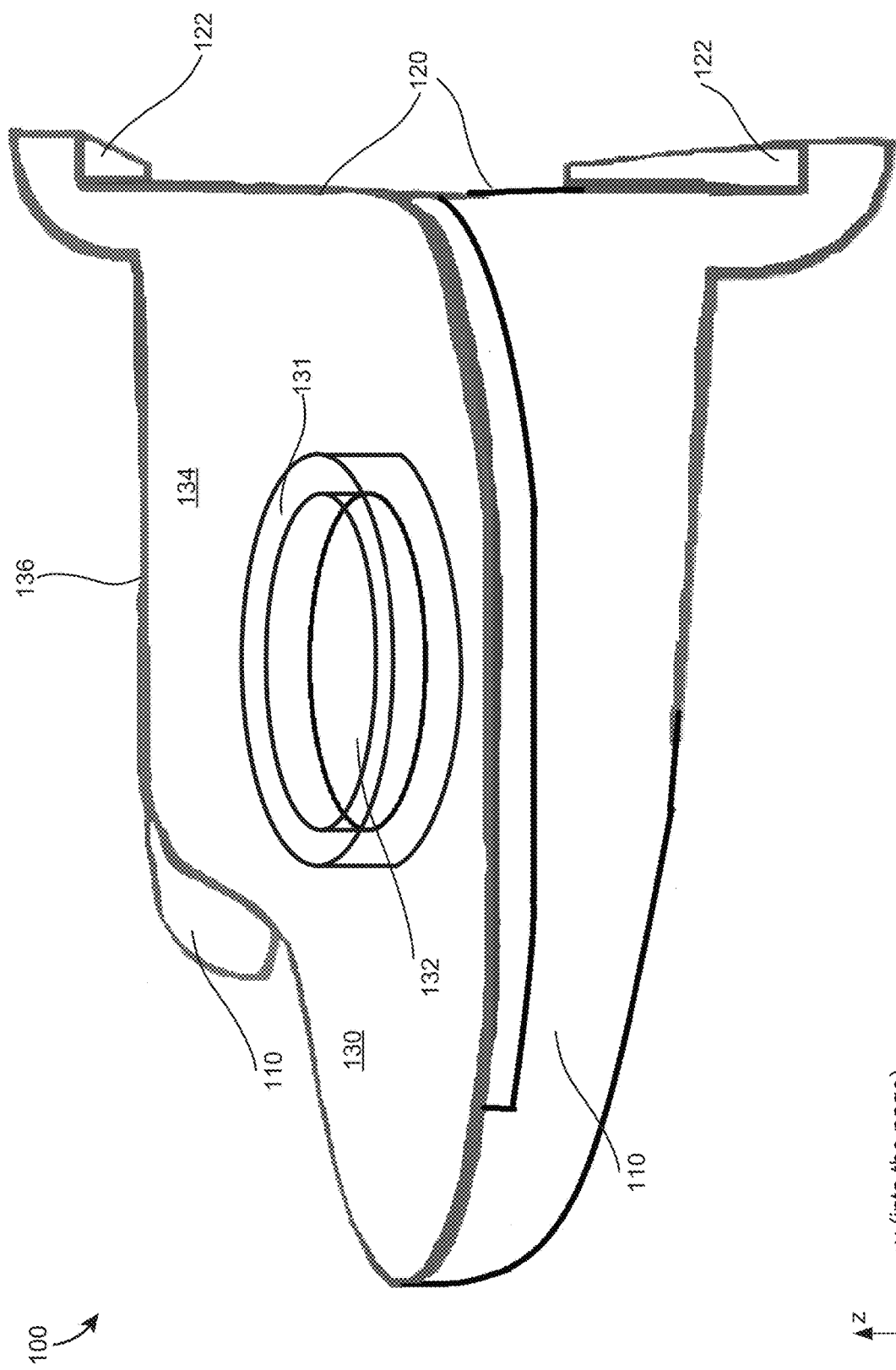
FIG. 1K illustrates a perspective side view of a cutting apparatus according to some embodiments.
Figure 1L:
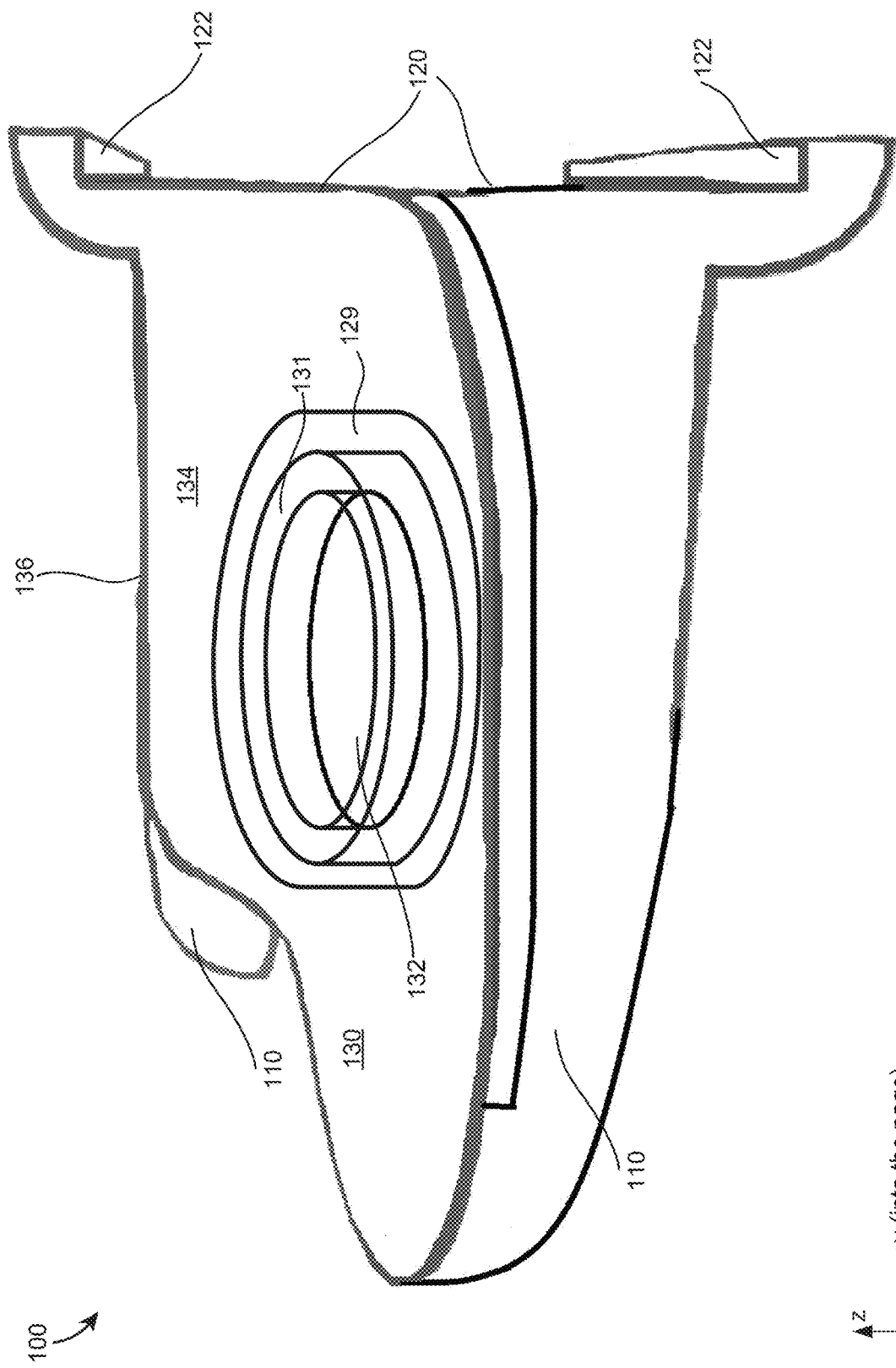
FIG. 1L illustrates a perspective side view of a cutting apparatus according to some embodiments.

In some embodiments, as shown in FIGS. 1K and 1L, the handle portion 130 may include an elevated region or protrusion 131. The elevated region or protrusion may include a magnetic material. A channel or opening corresponding to the eyelet 132 may extend through the entire elevated region or protrusion 131 in a z-direction. Although the elevated region or protrusion 131 is shown to extend from the female component 105, it is understood that a similar or same elevated region or protrusion may also extend from the male component 155 as a mirror of the elevated region or protrusion 131. Additionally, as shown in FIG. 1L, a grip 129 may be positioned over the elevated region or protrusion 131. In some examples, the grip 129 may be fitted over the elevated region or protrusion 131, and/or glued to or otherwise affixed over the elevated region or protrusion 131. The grip may be comprised of any suitable material, including rubber.

Figure 1M:
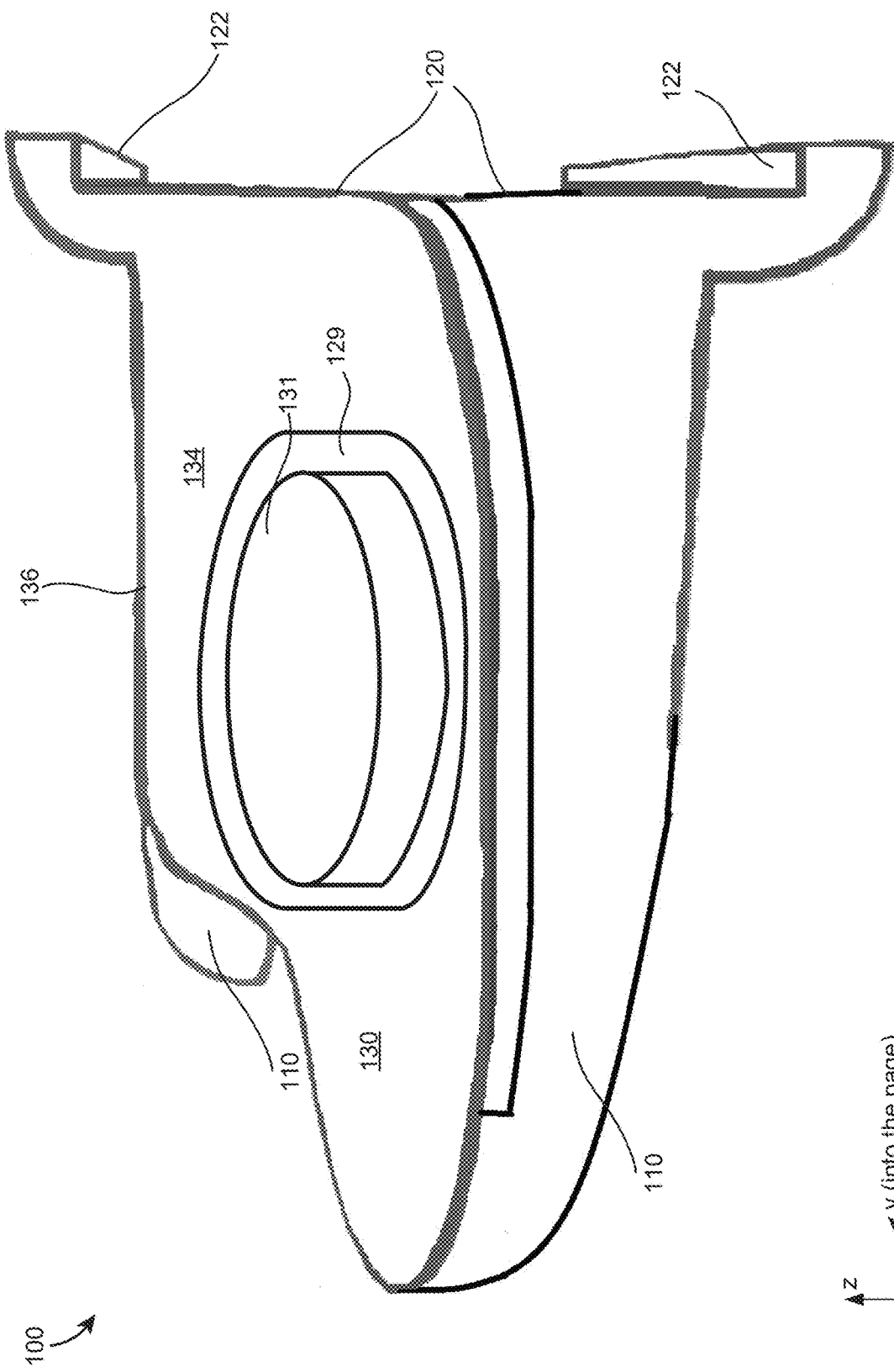
FIG. 1M illustrates a perspective side view of a cutting apparatus according to some embodiments.
Figure 10:
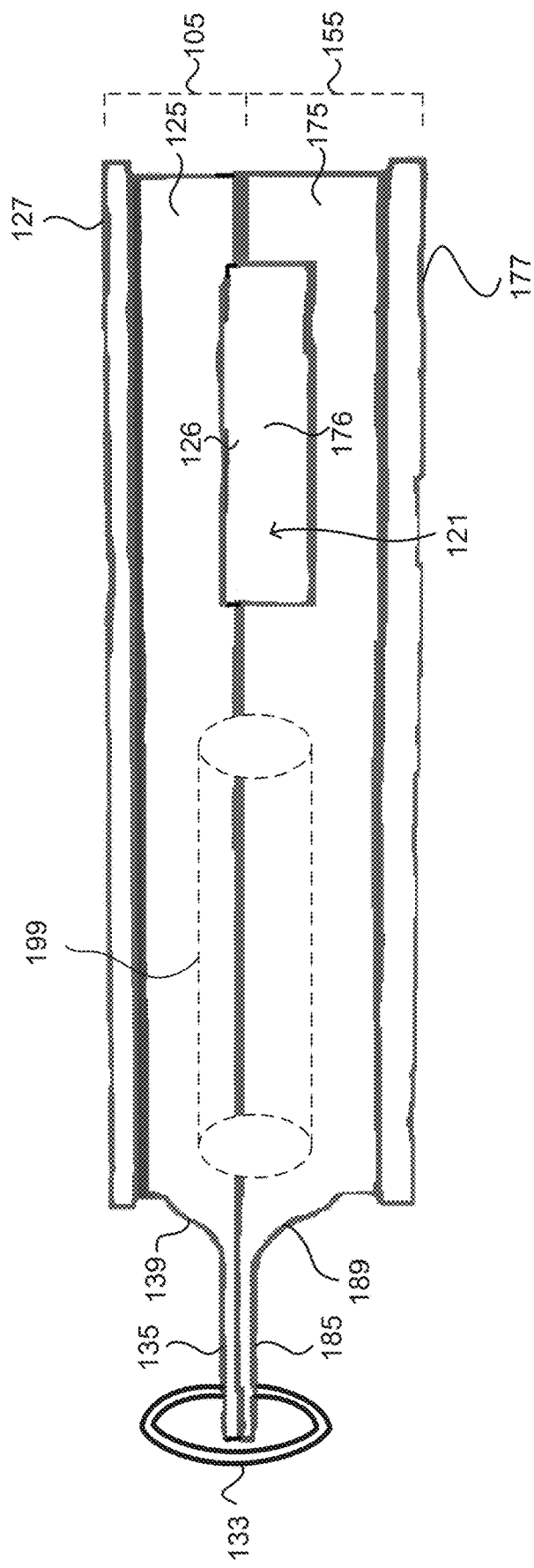

FIG. 1M illustrates an alternative embodiment to that shown in FIG. 1L, in which no channel or opening extends through the elevated region or protrusion 131. Similar to FIG. 1L, the grip 129 may be positioned over the elevated region or protrusion 131. In some examples, the grip 129 may be fitted over the elevated region or protrusion 131, and/or glued to or otherwise affixed over the elevated region or protrusion 131. The grip may be comprised of any suitable material, including rubber.

In some embodiments, as shown in FIGS. 1N and 1O, the handle portion 130 may include a ring 133, which may be magnetic. The ring 133 may extend between the male component 155 and the female component 105.

Figure 1P:
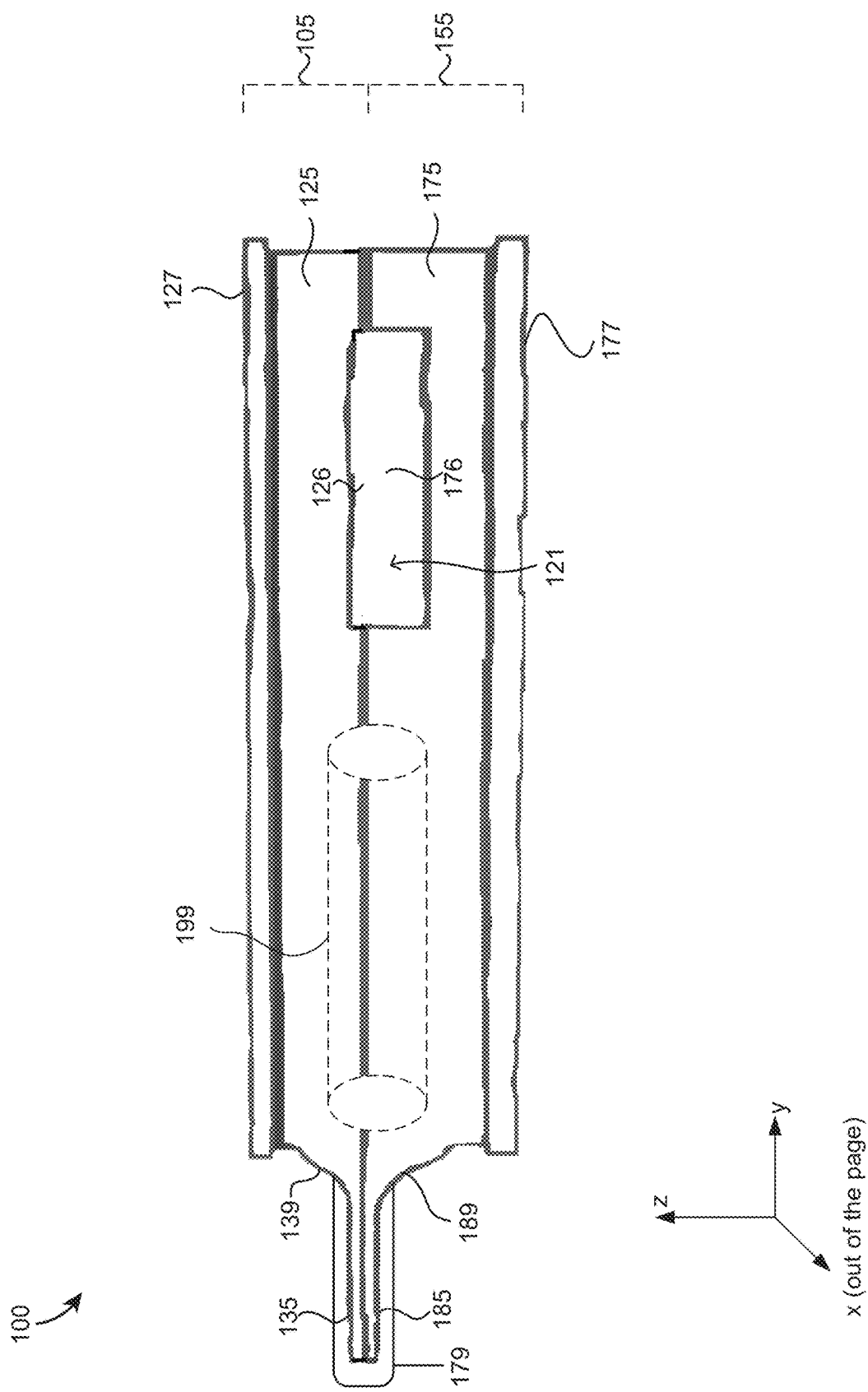
FIG. 1P illustrates a front surface of a cutting apparatus according to some embodiments.

FIG. 1P includes a grip 179 fitted over the handle portion 135 of the female component 105 and the handle portion 185 of the male component 155. In some embodiments, the grip 179 may be fitted over a magnetic covering surrounding the handle portion 135 of the female component 105 and the handle portion 185 of the male component 155. The grip 179 may be glued to or otherwise affixed over the handle portion 135 of the female component 105 and the handle portion 185 of the male component 155. The grip 179 may be comprised of any suitable material, including rubber.

Figure 2A:
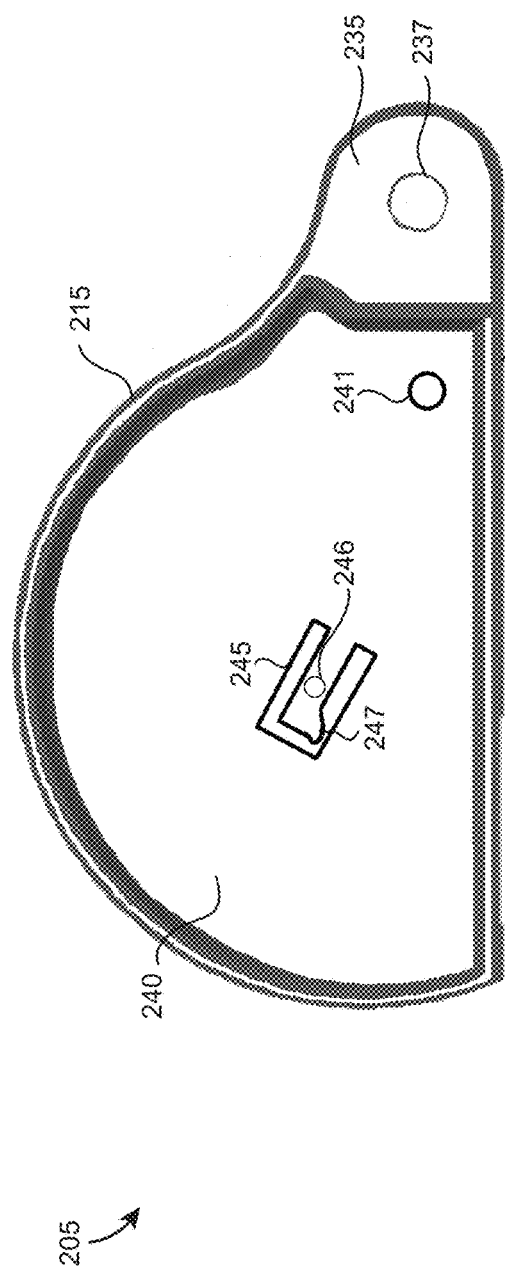
FIGS. 2A and 2B illustrate underside surfaces of a female component and a male component, respectively, of a cutting apparatus, according to some embodiments.
Figure 2B:
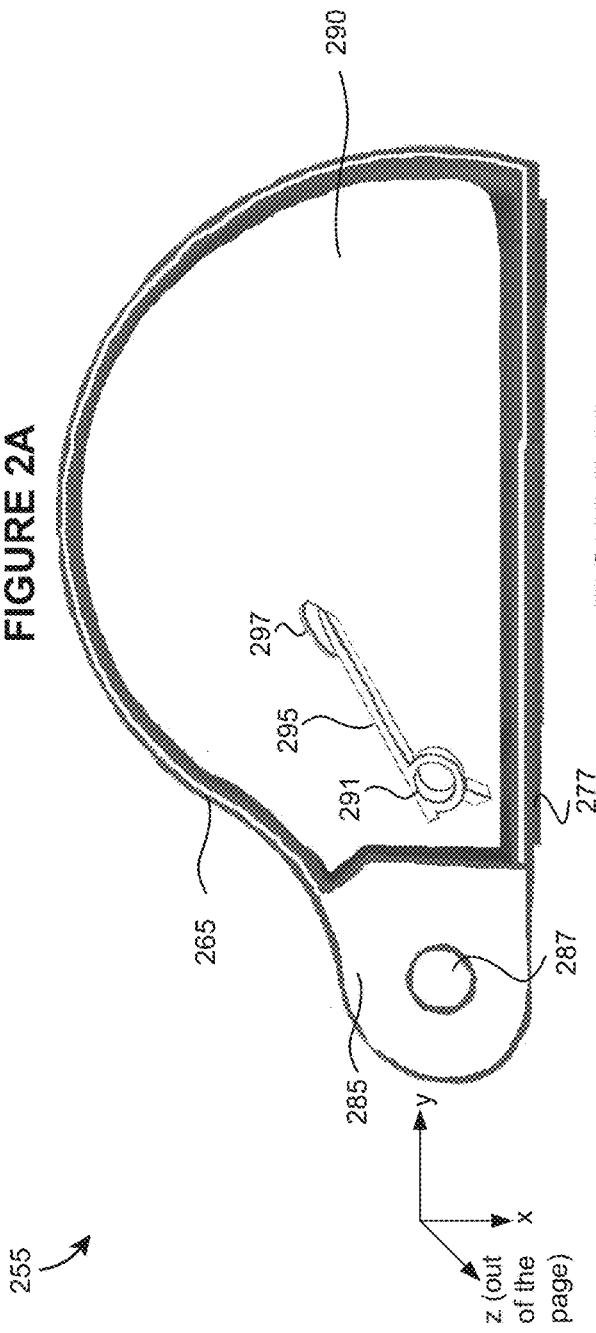

FIGS. 2A and 2B illustrate underside surfaces of a female component 205 and a male component 255, respectively, of a cutting apparatus, which may be used in conjunction with, or in place of, any of the embodiments shown in FIGS. 1A-1J. The female component 205 and the male component 255 are similar to the female component 105 and the male component 255, for example, shown in FIGS. 1C and 1D, except a mechanism to connect or couple the female component 205 and the male component 255 differs from that shown in FIGS. 1C and 1D. Rather than coupling pins or connectors, in FIG. 2A, the male component 255 may include a link 295 having a ring 291 and a ridge 297. The female component 205 may include a connector 241 and a catch 245 including an indentation 247 in an interior cavity 240. The catch 245 may be rotatable about an axis 246. The ring 291 on the male component 255 may be fitted snugly into the connector 241 on the female component 205. The link 295 may be fitted into the catch 245 as the ridge 297 is positioned into the indentation 247 to lock the female component 205 to the male component 255. In such a manner, the male component 255 and the female component 205 may be snapped together rather than having to be glued together.

In FIG. 2A, the female component 205 of the cutting apparatus 100 includes a handle portion 235 having an eyelet 237, and further includes a periphery 215 and an overhang 227. In FIG. 2B, the male component 255 of the cutting apparatus 100 includes a handle portion 285 having an eyelet 287, and further includes a periphery 265 and an overhang 277.

FIGS. 3A, 3B, 4A, 4B, 5A, 5B, 6A, 6B, 7A, and 7B illustrate implementations of a blade, gear or other cutting assembly that may be used in conjunction with the embodiments illustrated in FIGS. 1A-1J and 2A-2B. In FIG. 3A, a male component 355 includes a blade 395 secured into an interior cavity 390 by fasteners 396, 397, and 398. As shown in FIG. 3B, the fasteners 396, 397, and 398 may include rubber shafts or other pieces of material used to rigidly secure the blade 395 into the interior cavity 390. The blade 395 may comprise a ceramic or a metallic blade. Although three fasteners are shown, any number of fasteners may be used to secure the blade 395 in the interior cavity 390. Positioned along a negative z direction with respect to the blade 395 is a guard 399 that prevents a sharp edge of the blade 395 from puncturing objects or skin. Another guard may be positioned on an opposite side of the blade 395 in addition or in place of the guard 399. The guard 399 may include a rubber material. The blade 395 and the guard 399 may be exposed in an opening (e.g., the opening 121 of FIG. 1B). The male component 355 may be affixed to a female component, as shown in the embodiments illustrated in FIGS. 1A-1J and 2A-2B. In FIG. 3A, the male component 355 includes a handle portion 385 having an eyelet 387, and further includes a periphery 365, an overhang 377, and male coupling pins 391, 392, 393, and 394 which may be connected to complementary female coupling pins.

In FIGS. 4A and 4B, a male component 455 includes a blade 495 secured into an interior cavity 490 by fasteners 461, 462, 463, 471, 472, and 473. The male component 455 is similar to the male component 355 in FIG. 3A, except that the blade 495 is double-edged rather than single-edged as shown in FIG. 3A. As shown in FIGS. 4A and 4B, the fasteners 461, 462, 463, 471, 472, and 473 may include rubber shafts or other pieces of material used to rigidly secure the blade 495 into the interior cavity 490. The blade 495 may comprise a ceramic or a metallic blade. Although six fasteners are shown, any number of fasteners may be used to secure the blade 495 in the interior cavity 490. Positioned along a negative z direction with respect to the blade 495 is a guard 499 that prevents a sharp edge of the blade 495 from puncturing objects or skin. Another guard may be positioned on an opposite side of the blade 495 in addition or in place of the guard 499. The guard 499 may include a rubber material. The blade 495 and the guard 499 may be exposed in an opening (e.g., the opening 121 of FIG. 1B). The male component 455 may be affixed to a female component, as shown in the embodiments illustrated in FIGS. 1A-1J and 2A-2B. In FIG. 4A, the male component 455 includes a handle portion 485 having an eyelet 487, and further includes a periphery 465, an overhang 477, and male coupling pins 491, 492, 493, and 494 which may be connected to complementary female coupling pins.

In FIGS. 5A and 5B, a male component 555 includes a blade 595 secured into an interior cavity 590 by a fastener 596. The male component 555 is similar to the male component 355 in FIG. 3A, except that the blade 595 is a circular blade rather than single-edged as shown in FIG. 3A. As shown in FIG. 5B, the fasteners 596 may include rubber shafts or an other piece of material used to rigidly secure the blade 595 into the interior cavity 590. The blade 595 may comprise a ceramic or a metallic blade. Any number of fasteners may be used to secure the blade 595 in the interior cavity 590. Positioned along a negative z direction with respect to the blade 595 is a guard 599 that prevents an edge of the blade 595 from puncturing objects or skin. Another guard may be positioned on an opposite side of the blade 595 in addition or in place of the guard 599. The guard 599 may include a rubber material. The blade 595 and the guard 599 may be exposed in an opening (e.g., the opening 121 of FIG. 1B). The male component 555 may be affixed to a female component, as shown in the embodiments illustrated in FIGS. 1A-1J and 2A-2B. In FIG. 5A, the male component 555 includes a handle portion 585 having an eyelet 587, and further includes a periphery 565, an overhang 577, and male coupling pins 591, 592, 593, and 594 which may be connected to complementary female coupling pins.

In FIGS. 6A and 6B, a male component 655 includes a gear, blade, or other cutting edge (hereinafter "cutting edge") 695 which may be a circular edge and may include serrations. The cutting edge 695 may be secured into an interior cavity 690 via a central shaft 661 attached to a central pin 671. The central pin 671 may be directly in contact with and above the cutting edge 695 with respect to the z-axis. The central pin 671 may be threaded into the central shaft 661, and/or otherwise fastened or attached to the central shaft 661, such that the cutting edge 695 is directly positioned or sandwiched in between the central pin 671 and the central shaft 661. The cutting edge 695 may further be secured using a shaft 662 connected to a gear 672 that is acentric with respect to the cutting edge 695. The shaft 662 may be directly in contact with and positioned above the cutting edge 695 detachable so that the cutting edge 695 may be rotatable with respect to the shaft 662 when the shaft 662 is detached, such that the cutting edge may be rotated to a different (e.g., sharper) portion of the cutting edge 695 to cut a wrapper. The cutting edge 695 may comprise a ceramic or a metallic cutting edge. Positioned along a negative z direction with respect to the cutting edge 695 is a guard 699 that prevents the cutting edge 695 from puncturing objects or skin. The guard 699 may include a rubber material. Another guard may be positioned on an opposite side of the cutting edge 695 in addition or in place of the guard 699. The cutting edge 695 and the guard 699 may be exposed in an opening (e.g., the opening 121 of FIG. 1B). The male component 655 may be affixed to a female component, as shown in the embodiments illustrated in FIGS. 1A-1J and 2A-2B. In FIG. 6A, the male component 655 includes a handle portion 685 having an eyelet 687, and further includes a periphery 665, an overhang 677, and male coupling pins 691, 692, 693, and 694 which may be connected to complementary female coupling pins.

Figure 7A:
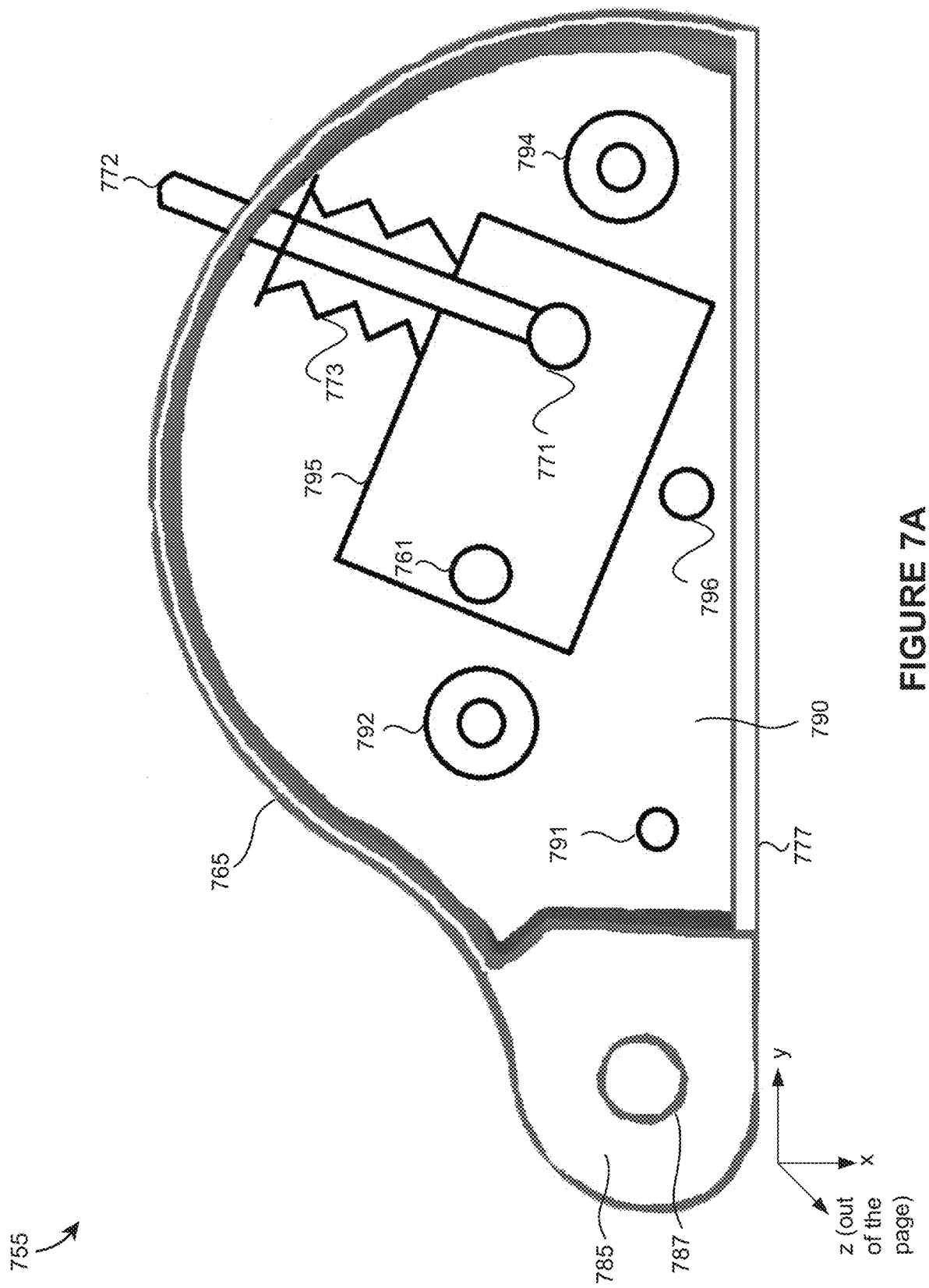
Figure 7B:
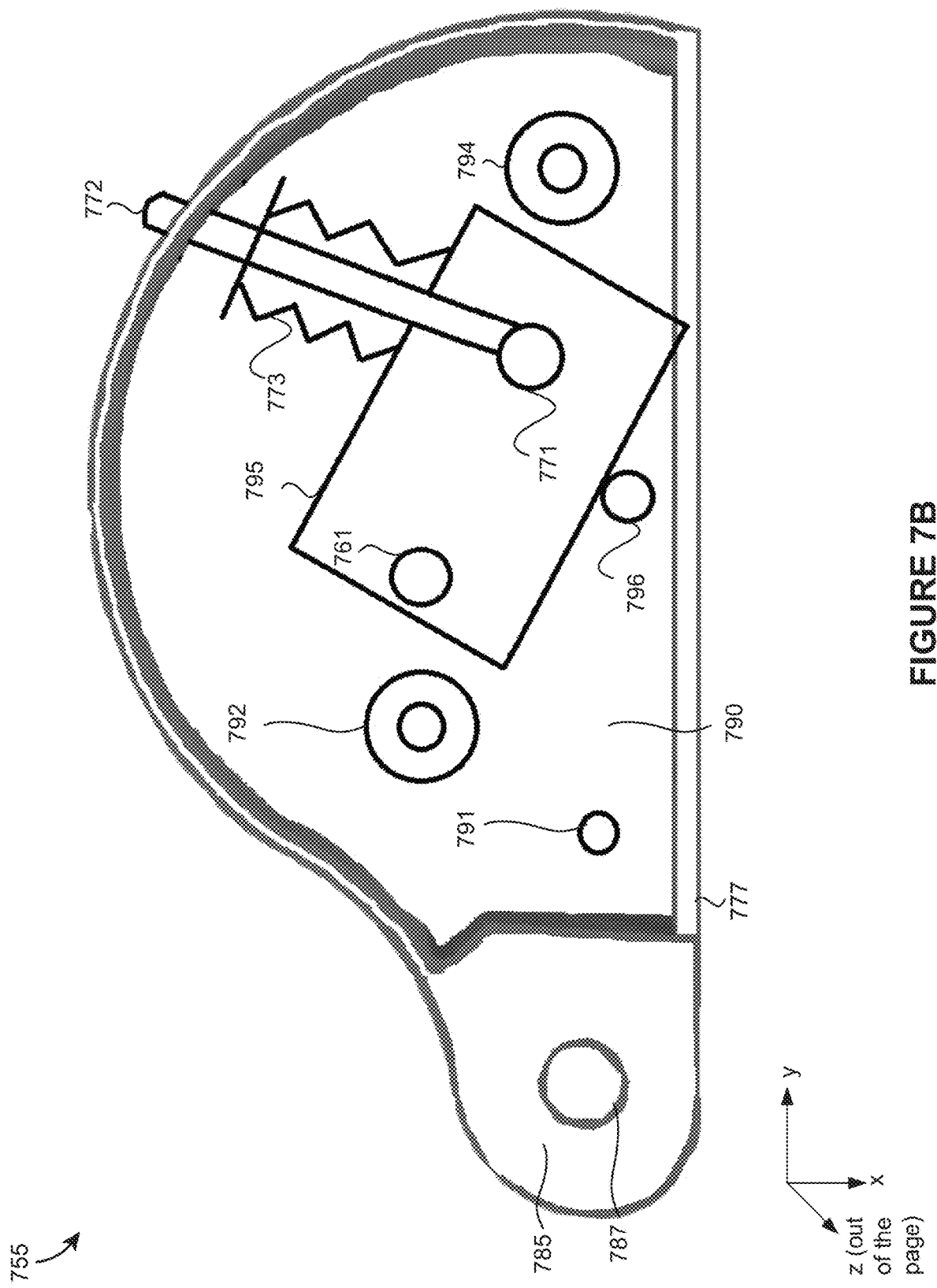

In FIGS. 7A-7B, a male component 755 includes a blade 795 whose movement and/or position may be controlled by an application of pressure from a plunger 772, which may be loaded by a spring 773. At an end of the plunger, a movable shaft 771 may contact the blade 795. When pressure is applied at a handle or knob of the plunger 772, the pressure may cause the movable shaft 771 to apply pressure to the blade 795, thereby causing a rotational displacement of the blade 795 about a stationary shaft 761, such that the blade 795 may be exposed through an opening of the male component 755, such as the opening 121 of FIG. 1B, which enables the blade 795 to contact a wrapper. Otherwise, when not in use, as shown in FIG. 7A, the blade 795 may be safely retracted within an interior cavity 790 of the male component 755 so that the blade 795 would not be exposed. The blade 795 may have a limited range of displacement, for example, when the blade 795 contacts a rest 796, the blade 795 may be restricted from further rotational displacement, as shown in FIG. 7B. The rest 796 may be a cylindrical shaft, for example. The blade 795 may comprise a ceramic or a metallic blade. Positioned along a negative z direction and/or a positive z direction with respect to the blade 795 may be one or more guards that further protects the blade 795 from puncturing objects or skin. The male component 755 may be affixed to a female component, as shown in the embodiments illustrated in FIGS. 1A-1J and 2A-2B. In FIGS. 7A-7B, the male component 755 includes a handle portion 785 having an eyelet 787, and further includes a periphery 765, an overhang 777, and male coupling pins 791, 792, and 794 which may be connected to complementary female coupling pins.

Figure 8A:
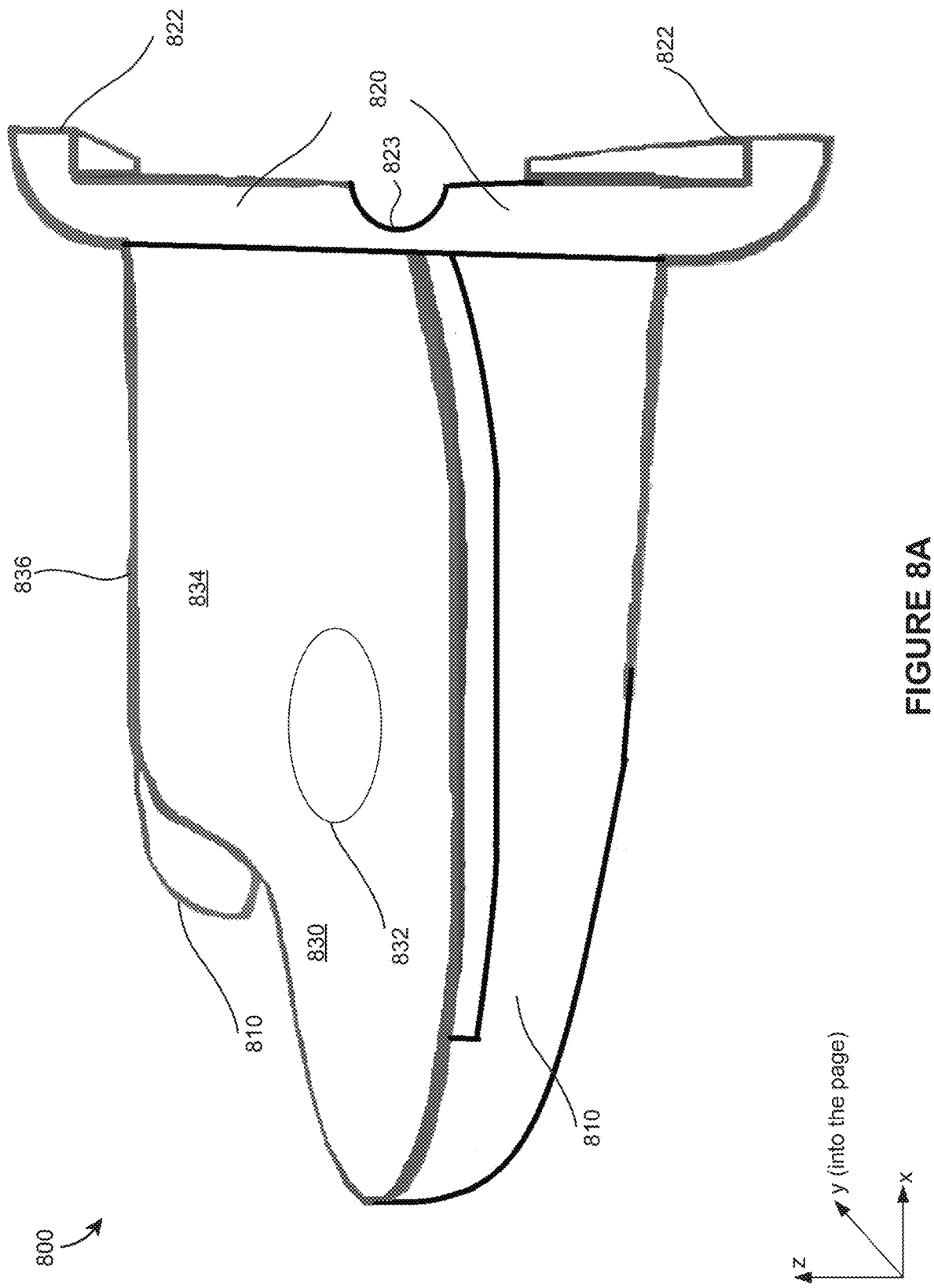
FIGS. 8A-8F illustrate implementations of a cutting apparatus that may be used alone or in conjunction with the embodiments illustrated in FIGS. 1A-1P, 2A-2B, 3A, 3B, 4A, 4B, 5A, 5B, 6A, 6B, 7A, and 7B, according to some embodiments.

FIG. 8A illustrates a cutting apparatus 800 according to some embodiments. In FIG. 8A, a side view of the cutting apparatus 800 is shown to include a periphery or rim (hereinafter "periphery") 810, rails 820 which constitute a part of the periphery 810 that is parallel to the y-z plane and disposed along a positive x-axis, overhangs, protrusions, or ledges (hereinafter "overhangs") 822, a handle portion 830 including an eyelet 832, inclined surfaces 834, and a body portion 836. The handle portion 830 may have a smaller width, along a z-direction, compared to the inclined surfaces 834 and the body portion 836. The rails 820 may be or include at least a partially flat segment and include an indentation or cavity 823 (hereinafter "indentation") to fit a roll of coins, as shown in FIG. 8A. The rails 820 may be a cutting surface on which a roll of coins is compressed against and moved along while cutting, and include an opening (not shown in FIG. 8A) through which a blade, gear, or other cutting instrument may extend. The indentation 823 may be semicircular, and be of any size or radius to accommodate the roll of coins. For example, the radius of the indentation 823 may match or approximately match a radius of a quarter, dime, nickel, penny, or any other coin. The roll of coins may fit snugly into the indentation 823 so that a user may simply slide the roll of coins longitudinally along the indentation 823. Unlike the rails 120 of FIG. 1A, the rails 820 may be detachable from the handle portion 830, the inclined surfaces 834, and the body portion 836. The rails 820 may be attachable or detachable to the handle portion 830, the inclined surfaces 834, and the body portion 836 by sliding through a slot or attaching via threads and/or mechanical fasteners such as screws, or attached or fastened via any suitable attachment or fastening mechanisms.

In some embodiments, the overhangs 822 may extend lower than a surface of, and/or be perpendicular to, the rails 820. The handle portion 830, the inclined surfaces 834, and the body portion 836 include corresponding surfaces of a lower portion of the cutting apparatus 800. In some embodiments, the handle portion 830 may be at least partially magnetic, or contain a magnetic covering on an exterior of the handle portion 830. The inclined surfaces 834 are positioned directly between and transition smoothly between the handle portion 830 and the body portion 836.

Figure 8B:
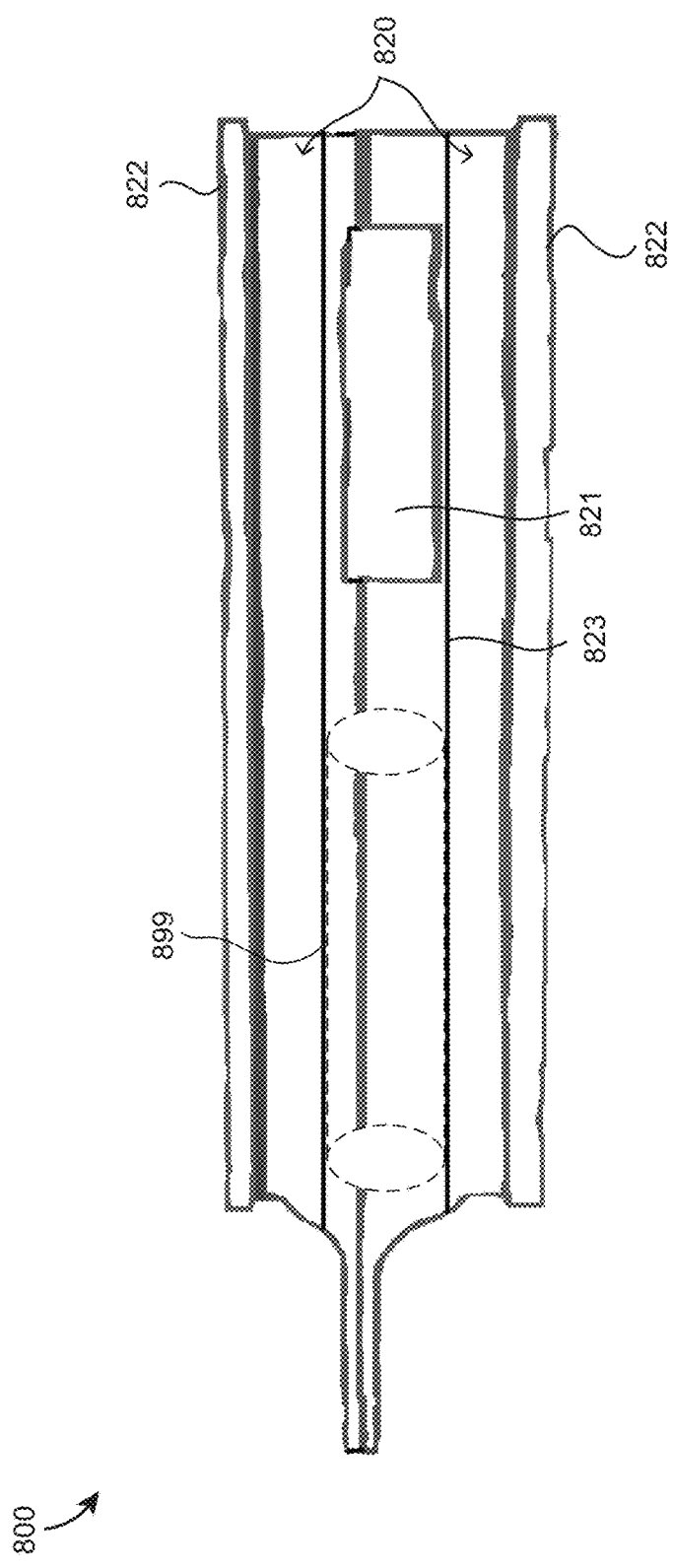

FIG. 8B illustrates a bottom view of the cutting apparatus 800, consistent with the embodiment shown according to FIG. 8A. In FIG. 8B, the rails 820 may include an opening 821 through which a blade, gear, or other cutting instrument may extend. When a roll of coins 899 is passed longitudinally along the indentation 823, across the opening 821 of the rails 820, a blade, gear, or other cutting instrument may safely engage the roll of coins along an axial or longitudinal axis of the roll of coins 899 to form an incision along the longitudinal axis.

Figure 8C:
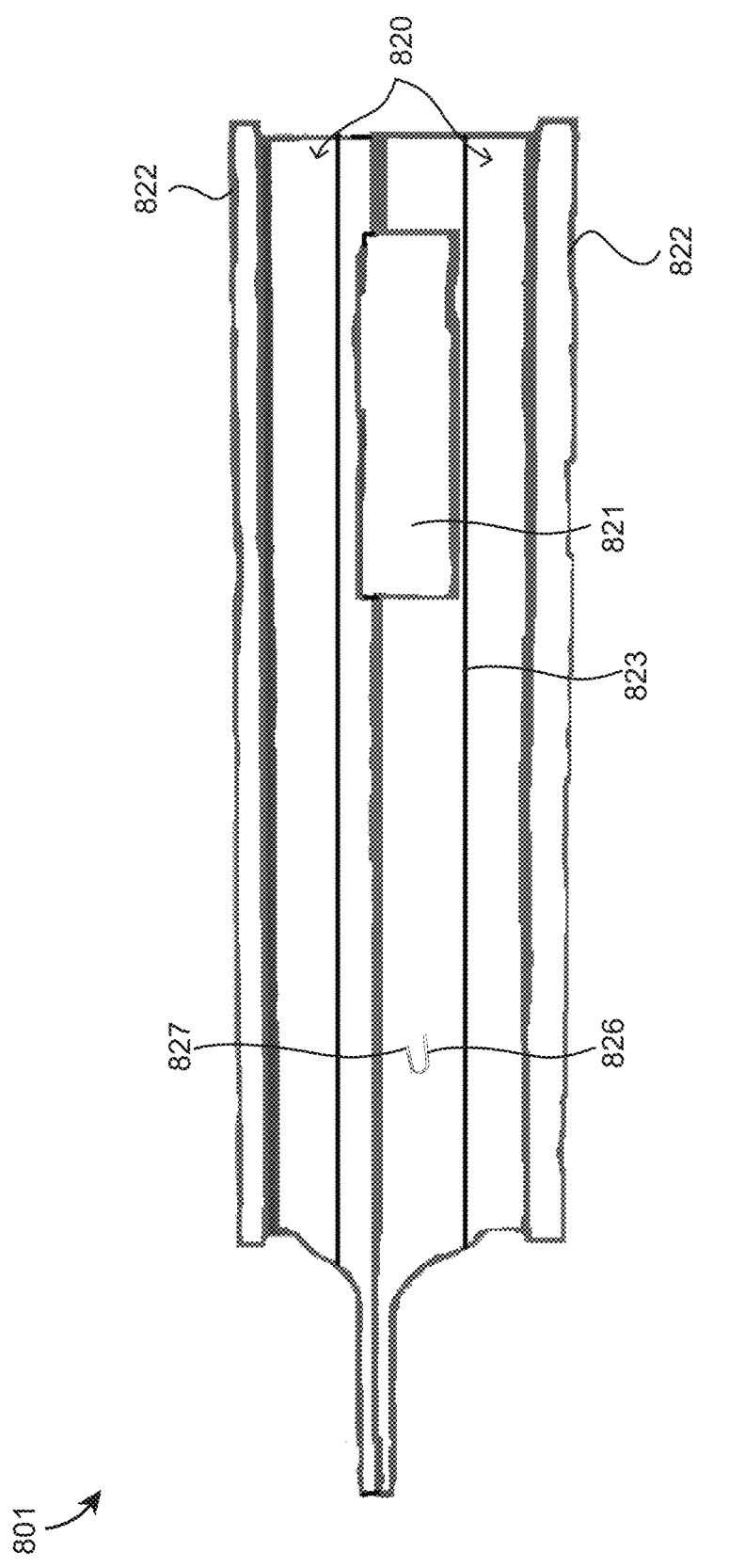

FIG. 8C illustrates a bottom view of a cutting apparatus 801. Components described in reference to FIGS. 8A and 8B may be applicable to FIG. 8C. The cutting apparatus 801 may be similar to the cutting apparatus 800 as shown in FIGS. 8A and 8B, except that the rails 820 may include a slit or indentation 827 (hereinafter "slit") through which a wedge of material 826 (hereinafter "wedge") may extend. As a roll of coins (e.g., the roll of coins 899 as shown in FIG. 8B) passes along the indentation 823, the roll of coins 899 may press against the wedge 826 such that the wedge 826 is retracted into the slit 827 and is not exposed past the slit 827. Upon pressing the wedge 826 into the slit 827, a blade, gear, or other cutting instrument may be exposed in the opening 821. Thus, when the wedge 826 is in a natural, unpressed state, the wedge 826 may be exposed past the slit 827 in a x-direction, and the blade, gear, or other cutting instrument may be unexposed past the opening 821. However, when the wedge 826 is pressed into the slit 827, the blade, gear, or other cutting instrument may be exposed past the opening 821 in the x-direction so that the blade, gear, or other cutting instrument cuts the roll of coins 899.

Figure 8D:
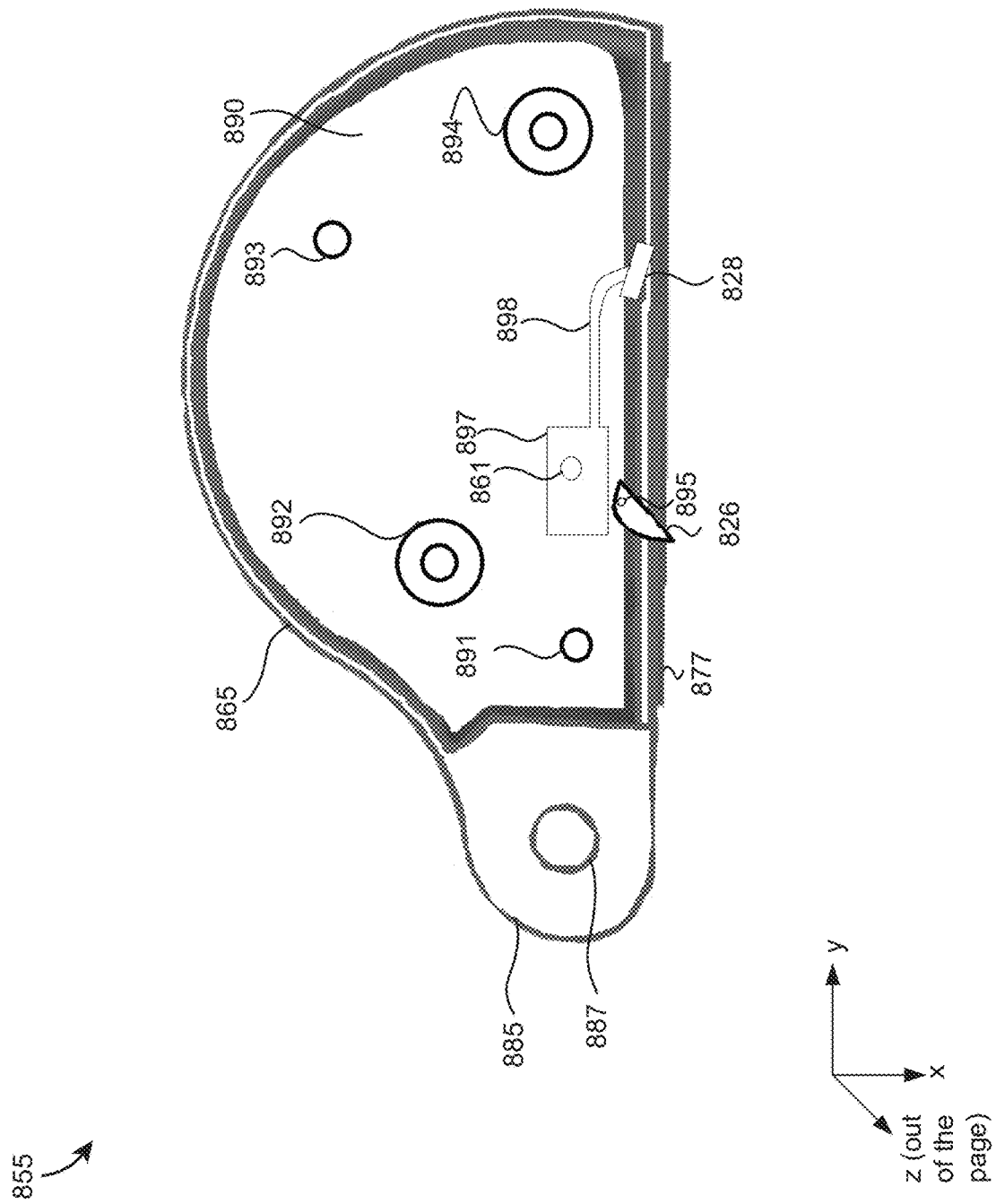
Figure 8E:
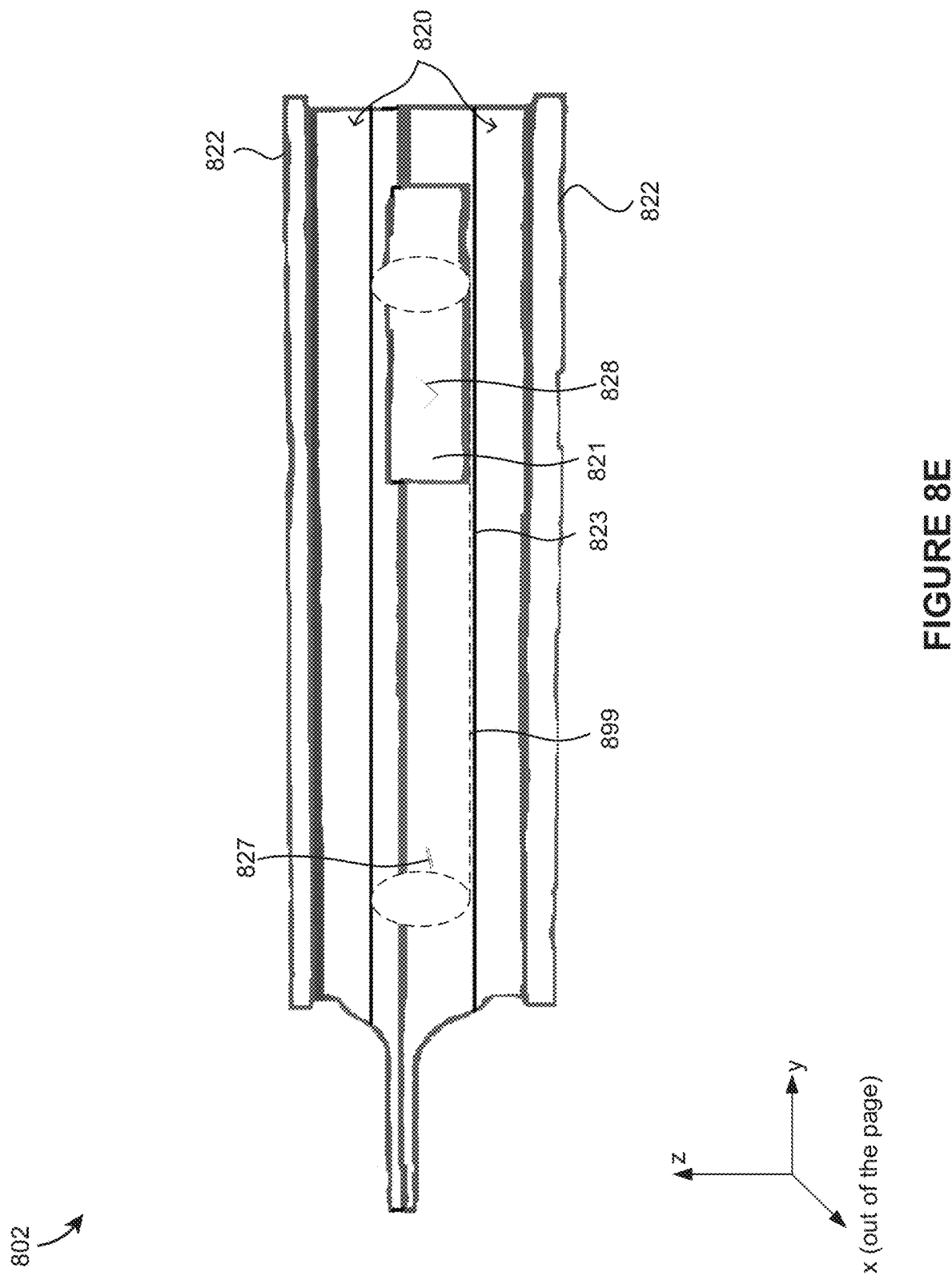
Figure 8F:
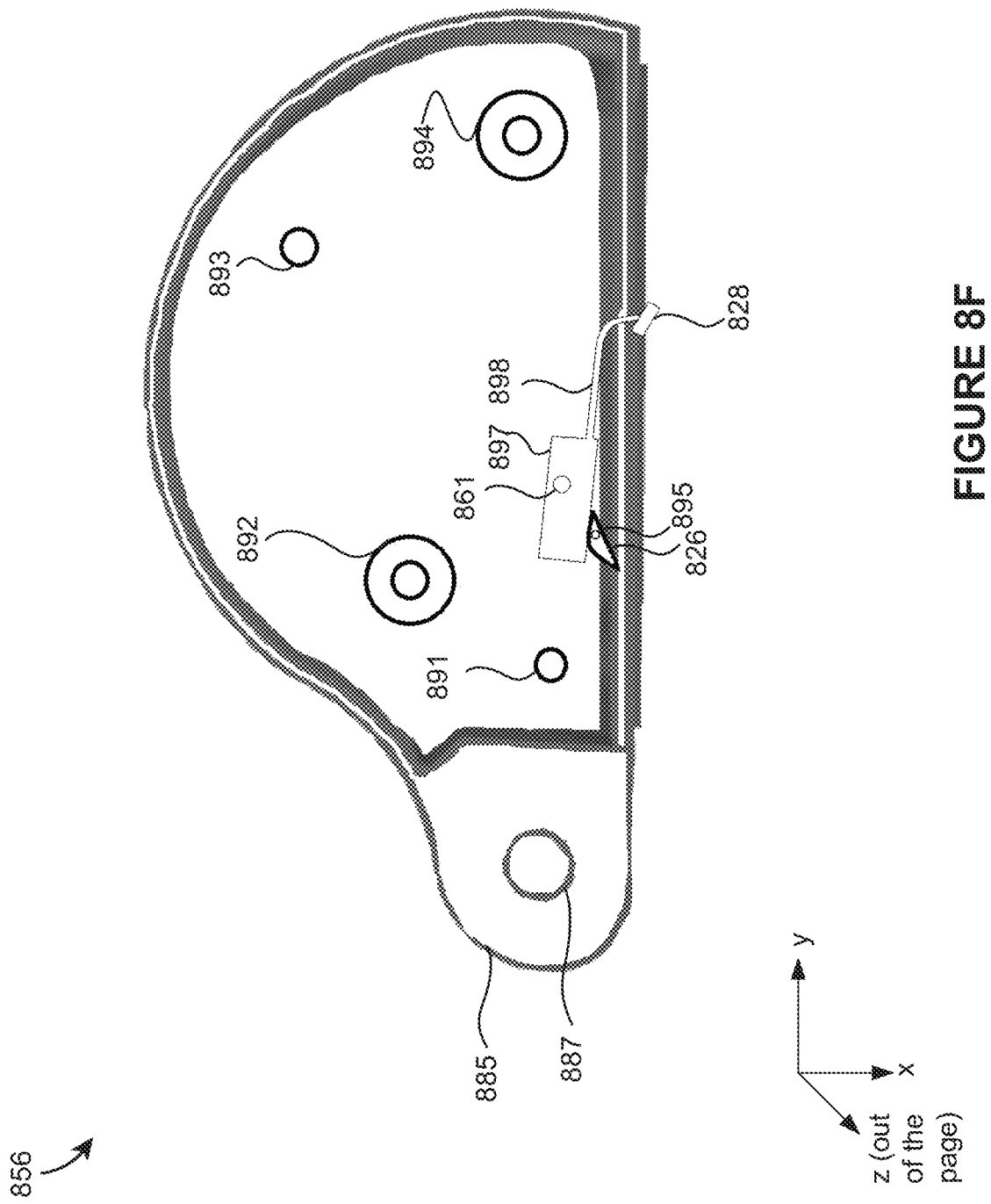

FIG. 8D illustrates an underside surface of a male component 855 of the cutting apparatus 801, consistent with the embodiment shown according to FIG. 8C. In FIG. 8D, the male component 855 of the cutting apparatus 801 includes a handle portion 885 (e.g., part of the handle portion 830) having an eyelet 887 (e.g., part of the eyelet 832), and further includes a periphery 865 (e.g., part of the periphery 810), an overhang 877 which is part of the overhangs 822, and an interior cavity 890 in which male coupling pins or connectors (hereinafter "male coupling pins") 891, 892, 893, and 894 may be connected to female coupling pins. Although four male coupling pins are shown, any number of male coupling pins may be present. The male coupling pins 891, 892, 893, and 894 may include alignment pins, for example. One or more of the male coupling pins 891, 892, 893, and 894 may be threaded and/or tapered to facilitate a rigid coupling between the male component 855 and a female component, while still permitting disassembly of the male component 855 and a female component if blade replacement is required. The cavity 890 may house additional components such as a blade, gear, or cutting assembly, and/or an additional or alternate attachment component. The cavity 890 may include a cutting assembly 897 attached at and rotatable about a shaft 861. The cutting assembly 897 may include an arm 898 connected to a blade, gear, or cutting apparatus 828 (hereinafter "blade"). The cutting assembly 897 may be spring loaded, in some embodiments, such that its natural, unpressed state may be as shown in FIG. 8D. The wedge 826 may be attached to and rotatable about a shaft 895. As shown in FIGS. 8E and 8F, when the roll of coins 899 presses onto the wedge 826, the wedge 826 may contact and apply a force onto the cutting assembly 897, causing the cutting assembly 897 to rotate about the shaft 861. Thus, the cutting assembly 897 may be caused to rotate and move with respect to the x-axis, causing the blade 828 to be moved past the opening 821.

FIGS. 8E and 8F illustrate a bottom view of a cutting apparatus 802 and an underside surface of a male component 856 of the cutting apparatus 802, respectively. Components described in reference to FIGS. 8A-8D may be applicable to FIGS. 8E and 8F. The cutting apparatus 802 may be similar to the cutting apparatus 801 as shown in FIGS. 8C and 8D, except that the wedge 826 and the cutting assembly 897 are in their pressed states rather than their natural, unpressed states. In FIGS. 8E and 8F the wedge 826 is pressed into the slit 827 to contact the cutting assembly 897. The cutting assembly 897 may thereby be caused to rotate about the shaft 861, thereby causing the blade 828 to be exposed in the opening 821 so that the blade 828 cuts the roll of coins 899. When force or pressure is removed from the wedge 826 so that the wedge 826 no longer applies force to the cutting assembly 897, the cutting assembly 897 may retract back to its natural, unpressed state as illustrated in FIG. 8D, and the wedge 826 may retract back to its natural, unpressed state as illustrated in FIGS. 8C and 8D. In such a manner, the blade 828 is only exposed through the opening 821 when the roll of coins 899 actually is in the process of being cut, and otherwise unexposed to increase safety of the cutting apparatus 802.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

A component being implemented as another component may be construed as the component being operated in a same or similar manner as the another component, and/or comprising same or similar features, characteristics, and parameters as the another component. In a description of a particular FIGURE, a reference to any other FIGURES may be construed as features from the particular FIGURE and the other FIGURES being combinable.

The invention claimed is:

1. A cutting apparatus for cutting a wrapper of a roll of coins along a longitudinal axis, comprising:
   an interior cavity disposed within a body portion;
   a rail section disposed beneath the interior cavity, the rail section comprising an opening through a cross section of the rail section, wherein a cutting surface comprises a pivotable blade that extends through the opening to cut the roll of coins which is compressed against the rail section while cutting;
   overhangs oriented at edges of, perpendicular to and extending below the rail section;
   a guard disposed parallel to and extending below the cutting surface, the guard including a rubber material and being exposed in the opening for preventing the cutting surface from puncturing skin or another surface besides the roll of coins;
   a movable shaft connected to the pivotable blade; and
   a plunger in contact with the movable shaft, wherein, in response to a force being applied to the plunger, the movable shaft transfers at least a portion of the applied force to the pivotable blade, thereby causing rotational displacement of the pivotable blade about a stationary shaft.

2. The cutting apparatus of claim 1, the pivotable blade having a single edge that extends through the opening to cut the roll of coins.

3. The cutting apparatus of claim 1, wherein the pivotable blade is in a retracted position in which the pivotable blade does not extend into the opening when no force is applied to the plunger, and in an extended position in which the pivotable blade extends into the opening when the force is applied to the plunger.

4. The cutting apparatus of claim 1, further comprising a second shaft positioned such that, when the pivotable blade contacts the second shaft, the pivotable blade is prevented from further rotational displacement.

5. The cutting apparatus of claim 1, wherein the pivotable blade comprises a ceramic material.

6. The cutting apparatus of claim 1, further comprising an extendible holder that extends from an overhang of the overhangs such that, during cutting, the roll of coins is positioned between the rail section and the extendible holder.

7. The cutting apparatus of claim 1, wherein the extendible holder comprises a concave section.

8. The cutting apparatus of claim 1, further comprising coupling pins disposed in the interior cavity, the coupling pins fastening portions of the body portion together.

9. The cutting apparatus of claim 1, further comprising:
   a handle portion adjacent to the interior cavity and having an eyelet, the handle portion having a uniform width throughout, the uniform width being smaller compared to a width of the interior cavity.

10. The cutting apparatus of claim 9, wherein a periphery of the handle portion is rounded.

11. The cutting apparatus of claim 1, wherein the rail section and the overhangs comprise rounded edges at their respective peripheries and linear edges at their respective interiors, the periphery of the rail section blending into the peripheries of the overhangs.

12. The cutting apparatus of claim 1, wherein the overhangs extend beyond a width of the body portion.

13. The cutting apparatus of claim 1, wherein a periphery of the body portion is rounded and forms an exterior of the cutting apparatus.

\* \* \* \* \*